(12) United States Patent
De Garavilla et al.

(10) Patent No.: US 12,138,511 B2
(45) Date of Patent: Nov. 12, 2024

(54) GOLF BALL

(71) Applicant: Dow Global Technologies LLC, Midland, MI (US)

(72) Inventors: James R. De Garavilla, Silsbee, TX (US); Keith C. Anderson, Hockessin, DE (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 17/757,724

(22) PCT Filed: Dec. 17, 2020

(86) PCT No.: PCT/US2020/065481
§ 371 (c)(1),
(2) Date: Jun. 20, 2022

(87) PCT Pub. No.: WO2021/127093
PCT Pub. Date: Jun. 24, 2021

(65) Prior Publication Data
US 2022/0355165 A1    Nov. 10, 2022

Related U.S. Application Data

(60) Provisional application No. 62/951,194, filed on Dec. 20, 2019.

(51) Int. Cl.
*A63B 37/06* (2006.01)
*A63B 37/00* (2006.01)
*A63B 45/00* (2006.01)

(52) U.S. Cl.
CPC .......... *A63B 45/00* (2013.01); *A63B 37/0039* (2013.01); *A63B 37/0051* (2013.01); *A63B 37/0065* (2013.01); *A63B 37/0069* (2013.01); *A63B 37/0074* (2013.01); *A63B 37/0075* (2013.01)

(58) Field of Classification Search
CPC ............................ A63B 45/00; A63B 37/0023
See application file for complete search history.

(56) References Cited

U.S. PATENT DOCUMENTS

| | | |
|---|---|---|
| 5,407,998 A | 4/1995 | Horiuchi et al. |
| 5,733,206 A | 3/1998 | Nesbitt et al. |
| 5,976,443 A | 11/1999 | Nesbitt et al. |
| 6,368,236 B1 | 4/2002 | Sullivan et al. |
| 2003/0008975 A1* | 1/2003 | Takesue ............. C08F 8/30 525/125 |
| 2004/0242802 A1 | 12/2004 | Voorheis et al. |
| 2009/0170634 A1 | 7/2009 | Loper et al. |
| 2009/0321690 A1 | 12/2009 | Akimoto et al. |
| 2011/0159993 A1 | 6/2011 | Kim et al. |
| 2013/0267348 A1 | 10/2013 | Loper et al. |
| 2014/0045622 A1 | 2/2014 | Molinari |

OTHER PUBLICATIONS

PCT/US2020/065481, International Search Report and Written Opinion with a mailing date of Mar. 29, 2021.
PCT/US2020/065481, International Preliminary Report on Patentability with a mailing date of Jun. 30, 2022.

* cited by examiner

*Primary Examiner* — Raeann Gorden

(57) ABSTRACT

A formulation for making at least one element of a golf ball, wherein the formulation includes: (i) from 50 weight percent to 95 weight percent of a thermoplastic composition comprising: (1) at least one ethylene acid copolymer consisting essentially of copolymerized comonomers of: (A) ethylene, and (B) from 5 weight percent to 25 weight percent of at least one α,β-ethylenically unsaturated carboxylic acid having from 3 carbon atoms to 8 carbon atoms, based on the total weight of monomers present in the ethylene acid copolymer; wherein the acid moieties of component (1) are neutralized to a level of from 25 percent to 220 percent; and (ii) from 5 weight percent to 50 weight percent of a crosslinked material having a gel content of at least 80 weight percent, wherein the crosslinked material is a crosslinked elastomer, a crosslinked rubber, or a blend of a crosslinked elastomer and a crosslinked rubber; a process for making the above formulation; at least one element of a multilayer golf ball and a process for making the at least one element of a multilayer golf ball using the above formulation; a multilayer golf ball including (a) at least one core, and (b) a cover; wherein the at least one core is made from the above formulation; and a process of manufacturing the above multilayer golf ball.

8 Claims, No Drawings

GOLF BALL

TECHNICAL FIELD

The present invention is related to a formulation to make a golf ball structure and to golf balls made from such formulation; and more specifically, the present invention is related to a multilayer golf ball having a modified core and/or one or more intermediate layers prepared from such formulation comprising a thermoplastic composition and a crosslinked material sufficient to alter the sound produced by the golf ball when the golf ball is struck with a golf club without substantially altering the hardness and compression or other mechanical properties of the golf ball.

BACKGROUND

Premium golf balls include wound balls, two-piece balls and multilayered balls. Wound balls may have a spherical molded center, elastomeric thread-like material wound around the center, and either a thermoplastic or thermoset cover. Two-piece balls have a spherical molded core covered with a thin layer of thermoplastic or thermoset material. Multilayered balls (i.e., balls having three or more layers) have a spherical molded core, a cover, and one or more intermediate layers between the core and the cover.

Of the physical characteristics of a golf ball, the two most sought physical characteristics are: (1) high resilience and (2) good feel. High resilience gives a golf ball added distance, which is particularly desired by casual golfers. The sound that is produced by a sharp impact loading of a golf ball by a flat massive object (e.g. the face of a golf club) is another important characteristic of a golf ball. The sound generated by a golf club impacting a golf ball is distinctive. Knowledgeable players and spectators can distinguish something of the quality of a golf shot by the characteristic sound of a "click" that occurs during golf ball impact. Golfers that are curious about the properties of a golf ball will often drop the golf ball on a hard surface to hear as well as to see how the golf ball rebounds. Manipulating the sound of a golf ball can be an effective way to "tune" the performance of golf balls to a specific player and/or a club.

However, high resilience golf balls (also known as distance balls) generally are considered hard golf balls and such hard golf balls do not provide a good feel for pitch shots and putting. A golf ball having what is called a "good feel" typically is softer than a distance ball. The soft golf ball gives the golfer more confidence to control the distance of a putt or a pitch shot, but the soft golf ball offers less distance for long shots. However, the perceived feel of a golf ball is determined by more than the compression and resilience characteristics of a golf ball. When determining the feel of a golf ball, most avid golfers, from casual to professional, are sensitive to the sound of the ball when struck with a golf club. A loud, high-pitched sound of a golf ball is associated with a hard, high resilience ball, while a soft, low-pitched sound of a golf ball is associated with a ball of improved feel and playability.

Golf balls having a high pitch or high acoustic output are viewed as too hard, while balls having a low pitch or low acoustic output are perceived as a ball having a short flight distance. This perception holds true regardless of the actual mechanical properties of a golf ball. Accordingly, it may be desirable to adjust the frequency and/or sound pressure level for golf balls, while retaining the desired mechanical properties of the golf balls. This will allow the golf ball manufacturer to adjust the post-impact sound of the golf ball so that the sound of the golf ball is tuned to the satisfaction of a golfer, while retaining the mechanical properties of the ball.

SUMMARY

In one or more embodiments, the present invention is a composition or formulation for making at least one element of a golf ball, wherein the formulation includes:
(i) from 50 weight percent to 95 weight percent of a thermoplastic composition comprising:
  (1) at least one ethylene acid copolymer consisting essentially of copolymerized comonomers of:
    (A) ethylene, and
    (B) from 5 weight percent to 25 weight percent of at least one $\alpha,\beta$-ethylenically unsaturated carboxylic acid having from 3 carbon atoms to 8 carbon atoms, based on the total weight of monomers present in the ethylene acid copolymer; wherein the acid moieties of component (1) are neutralized to a level of from 25 percent to 220 percent; and
(ii) from 5 weight percent to 50 weight percent of a crosslinked material having a gel content of at least 80 weight percent, wherein the crosslinked material is a crosslinked elastomer, a crosslinked rubber, or a blend of a crosslinked elastomer and a crosslinked rubber.

In another embodiment, the above formulation further includes: (2) at least one aliphatic, monofunctional organic acid having 4 carbon atoms to 36 carbon atoms, or salt thereof; wherein the longest carbon chain of the at least one aliphatic, monofunctional organic acid or salt thereof, component (2), is substituted with from one to three substituents independently selected from the group consisting of alkyl groups having from 1 carbon atom to 8 carbon atoms; and wherein the concentration of the at least one aliphatic, monofunctional organic acid or salt thereof, component (2), is from 20 weight percent to 40 weight percent, based on the total weight of the thermoplastic composition.

In another embodiment, the at least one ethylene acid copolymer of the formulation includes (C) from 10 to 30 wt % of at least one C3 to C8 $\alpha,\beta$-ethylenically unsaturated carboxylic acid ester.

In still another embodiment, the formulation further includes (iii) from 10 weight percent to 30 wt % of at least one C3 to C8 $\alpha,\beta$-ethylenically unsaturated carboxylic acid ester; wherein the at least one C3 to C8 $\alpha,\beta$-ethylenically unsaturated carboxylic acid ester is acrylic acid, methacrylic acid, or a combination of acrylic acid and methacrylic acid.

In still another embodiment, the present invention includes a process for making the above formulation.

In yet other embodiments, the present invention includes at least one element of a multilayer golf ball such as a core of a golf ball and/or an intermediate layer disposed between the core of a golf ball and the cover of a golf ball comprising the above formulation.

In even still another embodiment, the present invention includes a process for making at least one element of a multilayer golf ball using the above formulation.

According to other embodiments, the present invention is directed to a multilayer golf ball including (a) at least one core, and (b) a cover; wherein the at least one core is made from a formulation comprising:
(i) from 50 wt % to 95 wt % of a thermoplastic composition comprising at least one ethylene acid copolymer consisting essentially of copolymerized comonomers of (A) ethylene, and (B) from 5 wt % to 25 wt % of at least one C3 to C8 $\alpha,\beta$-ethylenically unsaturated carboxylic acid, based on the total weight of monomers present in the ethylene acid copolymer, wherein the at least one ethylene acid copolymer has a melt index (I2) of from 200 g/10 min to 600 g/10 min, as measured according to ASTM D1238 at 190° C. using a 2.16 kg weight; wherein the combined acid moieties of the at least one ethylene acid copolymer, component (i), is neutralized to a level of from 25% to 220%; and (ii) from 5 wt % to 50 wt % of a crosslinked material having a gel content of at least 80 wt %, wherein the crosslinked material is a crosslinked elastomer, a crosslinked rubber, or blends thereof.

In one or more other embodiments, the present invention described herein includes a golf ball comprising (a) at least one core, (b) a cover, and (c) at least one intermediate layer positioned between the at least one core and the cover, wherein the at least one core or the at last one intermediate layer is made from a formulation comprising:

(i) from 50 wt % to 95 wt % of a thermoplastic composition comprising: (1) at least one ethylene acid copolymer consisting essentially of copolymerized comonomers of (A) ethylene, and (B) from 5 wt % to 25 wt % of at least one C3 to C8 α,β-ethylenically unsaturated carboxylic acid, based on the total weight of monomers present in the ethylene acid copolymer, wherein the at least one ethylene acid copolymer has a melt index (I2) of from 200 g/10 min to 600 g/10 min, as measured according to ASTM D1238 at 190° C. using a 2.16 kg weight; and (2) at least one C4 to C36 aliphatic, monofunctional organic acid, wherein the longest carbon chain of the acid is optionally substituted with from one to three substituents independently selected from the group consisting of C1 to C8 alkyl groups; wherein the combined acid moieties of components (1) and (2) are neutralized to a level of from 25% to 220%; and (ii) from 5 wt % to 50 wt % of a crosslinked material having a gel content of at least 80 wt %, wherein the crosslinked material is a crosslinked elastomer, a crosslinked rubber, or blends thereof.

In still another embodiment, the present invention is directed to a process of manufacturing the above multilayer golf ball.

DETAILED DESCRIPTION

The following definitions apply to the terms as used throughout this specification, unless otherwise limited in specific instances; and the technical and scientific terms used herein have the meanings that are commonly understood by one of ordinary skill in the art to which the present invention belongs. In case of conflict, the present specification, including the definitions herein, will control. Tradenames are in uppercase.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed present invention. A 'consisting essentially of' claim occupies a middle ground between closed claims that are written in a 'consisting of' format and fully open claims that are drafted in a 'comprising' format. Optional additives as defined herein, at levels that are appropriate for such additives, and minor impurities are not excluded from a composition by the term "consisting essentially of".

When a composition, a process, a structure, or a portion of a composition, a process, or a structure, is described herein using an open-ended term such as "comprising," unless otherwise stated the description also includes an embodiment that "consists essentially of" or "consists of" the elements of the composition, the process, the structure, or the portion of the composition, the process, or the structure.

The articles "a" and "an" may be employed in connection with various elements and components of compositions, processes or structures described herein. This is merely for convenience and to give a general sense of the compositions, processes or structures. Such a description includes "one or at least one" of the elements or components. Moreover, as used herein, the singular articles also include a description of a plurality of elements or components, unless it is apparent from a specific context that the plural is excluded.

The term "or", as used herein, is inclusive; that is, the phrase "A or B" means "A, B, or both A and B". More specifically, a condition "A or B" is satisfied by any one of the following: A is true (or present) and B is false (or not present); A is false (or not present) and B is true (or present); or both A and B are true (or present). Exclusive "or" is designated herein by terms such as "either A or B" and "one of A or B", for example.

The term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such.

In addition, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. The scope of the present invention is not limited to the specific values recited when defining a range.

When materials, methods, or machinery are described herein with the term "known to those of skill in the art", "conventional" or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

As used herein, the term "copolymer" refers to polymers comprising copolymerized units resulting from copolymerization of two or more comonomers. In this connection, a copolymer may be described herein with reference to the copolymer's constituent comonomers or to the amounts of the copolymer's constituent comonomers, for example "a copolymer comprising ethylene and 18 wt % of acrylic acid", or a similar description. Such a description may be considered informal in that the description does not refer to the comonomers as copolymerized units; in that the description does not include a conventional nomenclature for the copolymer, for example International Union of Pure and Applied Chemistry (IUPAC) nomenclature; in that the description does not use product-by-process terminology; or for another reason. As used herein, however, a description of a copolymer with reference to the copolymer's constituent comonomers or to the amounts of the copolymer's constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

"Dipolymer" refers to polymers consisting essentially of two monomers and "terpolymer" refers to polymers consisting essentially of three monomers.

As used throughout this specification, the abbreviations given below have the following meanings, unless the context clearly indicates otherwise: "=" means "equal to"; @ means "at"; "<" means "less than"; ">" means "greater than"; Hz=hertz(s); kHz=kilohertz(s); g=gram(s); Mg=megagrams; mg=milligram(s); dg=decagrams; dg/min=decagrams per minute; kg=kilograms; kg/hr=kilograms per hour; g/cc=gram(s) per cubic centimeter; kg/m3=kilograms per cubic meter; L=liter(s); mL=milliliter(s); g/L=grams per liter; Mw=Mass molecular weight; L/D ratio=length per diameter ratio; m=meter(s); μm=microns: mm=millimeter(s); cm=centimeter(s); mm Mg=millimeters of mercury; dB=decibel(s); min=minute(s); s=second(s); ms=milliseconds; hr=hour(s); rpm=revolutions per minute; mm/min=millimeter(s) per minute; m/s= meter(s) per second; ° C.=degree(s) Celsius; mPa·s=millipascals-seconds; mPa=megapascals; kPa=kilopascals; Pa·s/m2=pascals-seconds per meter squared; cN=centinewton; mm2=millimeter squared; g/10 min=gram(s) per 10 minutes; %=percent; eq %=equivalent percent; vol %=volume percent; and wt %=weight percent.

Unless stated otherwise, all percentages, parts, ratios, and like amounts, are defined by weight. For example, all percentages stated herein are weight percentages (wt %), unless otherwise indicated.

Temperatures are in degrees Celsius (° C.), and "ambient temperature" means between 20° C. and 25° C., unless specified otherwise.

The present invention described in embodiments herein, in general, is directed to golf balls comprising at least one core, a cover, and, optionally, at least one intermediate layer positioned between the at least one core and the cover. The at least one core and/or the optional at least one intermediate layer is made from a formulation comprising (i) from 50 wt % to 95 wt % of a thermoplastic composition and (ii) from 5 wt % to 50 wt % of a crosslinked material having a gel content of at least 80 wt %, wherein the crosslinked material is a crosslinked elastomer, a crosslinked rubber, or blends thereof. The formulation may optionally further include (iii) from 10 wt % to 30 wt % of at least one α,β-ethylenically unsaturated carboxylic acid ester having from 3 carbon atoms to 8 carbon atoms.

All individual values and subranges are included and disclosed herein. For example, in some embodiments, the at least one core and/or the optional at least one intermediate layer is made from a formulation comprising (a) from 55 wt % to 95 wt %, from about 65 wt % to 95 wt %, from about 70 wt % to 95 wt %, from c 65 wt % to 90 wt %, or from 70 wt % to 90 wt % of a thermoplastic composition and (b) from 5 wt % to 45 wt %, from 5 wt % to 35 wt %, from 5 wt % to 30 wt %, from 10 wt % to 35 wt %, or from 10 wt % to 30 wt % of a crosslinked material having a gel content of at least 80 wt %, wherein the crosslinked material is a crosslinked elastomer, a crosslinked rubber, or blends thereof. In some embodiments, the golf ball comprises at least one intermediate layer and the at least one core is formed from the formulation. In other embodiments, the golf ball comprises at least one intermediate layer and the at least one intermediate layer is formed from the formulation.

In a general embodiment the formulation includes (i) at least one thermoplastic composition, (ii) at least one crosslinked material, and (iii) optionally, at least one α,β-ethylenically unsaturated carboxylic acid ester having from 3 carbon atoms to 8 carbon atoms.

In one embodiment, the thermoplastic composition, component (i), includes at least one ethylene acid copolymer; and in another embodiment, the thermoplastic composition includes: (1) the aforementioned at least one ethylene acid copolymer in combination with (2) at least one aliphatic, monofunctional organic acid having from 4 carbon atoms to 36 carbon atoms. Thus, in embodiments herein, the thermoplastic composition comprises: (1) at least one ethylene acid copolymer; and (2) optionally, but in a preferred embodiment, at least one aliphatic, monofunctional organic acid having from 4 carbon atoms to 36 carbon atoms; wherein the combined acid moieties of components (1) and (2) are neutralized to a level of from 25% to 220%.

The acid copolymers used to make the compositions described herein include, for example, "direct" acid copolymers. In "direct" copolymers, the copolymerized monomers are part of the polymer backbone or chain. In contrast, in graft copolymers, another comonomer is attached to non-terminal repeat units in an existing polymer chain, often by a subsequent free radical reaction. The ethylene acid copolymers useful in the present invention may be prepared by using, for example, "co-solvent technology" as described in U.S. Pat. No. 5,028,674.

In embodiments herein, the ethylene acid copolymers consist essentially of copolymerized comonomers of (A) ethylene; (B) from 5 wt % to 25 wt % of at least one C3 to C8 α,β-ethylenically unsaturated carboxylic acid; and, optionally, (C) from 10 wt % to 30 wt % of at least one C3 to C8 α,β-ethylenically unsaturated carboxylic acid ester, based on the total weight of monomers present in the ethylene acid copolymer.

The α,β-ethylenically unsaturated C3 to C8 carboxylic acid, component (B), useful in the present invention includes, for example, acrylic acid, methacrylic acid, itaconic acid, crotonic acid (trans-butenoic acid), isocrotonic acid (cis-butenoic acid), vinylacetic acid, (E)-4-methoxy-4-oxo-but-2-enoic acid, (Z)-4-ethoxy-4-oxo-but-2-enoic acid, vinyllactic acid, maleic acid, 2-methylmaleic acid or aconitic acid; or mixtures thereof. In some embodiments, the C3 to C8 α,β-ethylenically unsaturated carboxylic acid is acrylic acid, methacrylic acid, or a combination of acrylic acid and methacrylic acid.

The ethylene acid copolymers of the present invention may optionally include C3 to C8 α,β-ethylenically unsaturated carboxylic acid esters, component (C), when used in the present invention may include monoesters or, in some examples, diesters of α,β-unsaturated dicarboxylic acids with primary, secondary and/or tertiary saturated monohydric alcohols having from 1 carbon atom to 20 carbon atoms. The acid esters may be, for example, methyl, ethyl, propyl, butyl or the 2-ethylhexyl esters of acrylic acid, of methacrylic acid and/or itaconic acid, or the corresponding monoesters or diesters of maleic acid, fumaric acid or citraconic acid.

In addition to the at least one ethylene acid copolymer, the thermoplastic composition of the present invention may include, as an optional component (2), at least one aliphatic, monofunctional organic acid having from 4 carbon atoms to 36 carbon atoms.

For example, suitable aliphatic, monofunctional organic acids useful in the present invention include, without limitation, aliphatic, monofunctional organic acids having from 4 carbon atoms to 36 carbon atoms (C4-C36), wherein the longest carbon chain of the acid is optionally substituted with from one to three substituents independently selected from alkyl groups having from C1 (1 carbon atom) to C8 (8 carbon atoms). The organic acids may be saturated or unsaturated, and, if unsaturated, may include more than one carbon-carbon double bonds. The term "monofunctional" refers to acids with one carboxylic acid moiety. The suitable organic acids include from C4 to C36, for example, a C18 acid in one embodiment, C6 to C26 acids in another embodiment, C6 to C12 acids in still another embodiment, and C16 to C24 acids in yet another embodiment. In some embodiments, the at least one aliphatic, monofunctional organic acid is a linear, unsaturated aliphatic, monofunctional organic acid having from 16 carbon atoms to 24 carbon atoms (C16-C24).

Examples of suitable organic acids useful in the present invention include, but are not limited to, caproic acid, caprylic acid, capric acid, lauric acid, stearic acid, isostearic acid, behenic acid, erucic acid, oleic acid, iso-oleic acid, and linoleic acid; and mixtures thereof. Naturally derived organic fatty acids such as palmitic, stearic, oleic, erucic, behenic acids, and mixtures thereof may also be employed.

As known in the art, commercial grades of organic acids may include a number of structurally different organic acids of varying lesser amounts. As used herein, unless otherwise specified in limited circumstances, a composition that comprises a named acid may also include other acids that are present in commercial grades of the named acid, at levels that are proportional to their levels in the commercial grade. Furthermore, when the transitional term "consisting essentially of" is applied to compositions that comprise a named acid, other acids that are present in commercial grades of the named acid, at levels that are proportional to their levels in the commercial grade, are not excluded from the composition.

Saturated acids of particular note include stearic acid and behenic acid. Saturated linear organic acids (for example stearic acid and behenic acid) are acids comprising only one CH3 (methyl) and no CH (methenyl) moieties.

Unsaturated linear organic acids (for example oleic acid and erucic acid) are acids that have only one CH3 moiety and at least one carbon-carbon double bond. The unsaturated linear organic acids useful in the present invention may include any number of CH2 (methylene) groups, within the carbon count limits set forth above. Monounsaturated acids contain one carbon-carbon double bond. Of note are linear, unsaturated (including multi-unsaturated) organic acids having from 16 carbon atoms to 24 carbon atoms, including but not limited to oleic acid, erucic acid and linoleic acid. Naturally derived organic fatty acids such as (notably) oleic acid, and mixtures thereof, may be used. Oleic acid is commercially available under tradenames INDUSTRENE 106 or INDUSTRENE 206 (available from PMC Biogenix) or PRIOLENE 6900 or PRIOLENE 6910 (available from Croda-Uniqema). Erucic acid is available commercially under the trade name JARIC 22:1 from Jarchem Industries Inc. or as PRIFRAC 2990 from Croda-Uniqema.

In some embodiments, the longest carbon chain of the acid is substituted with from one to three C1 to C8 alkyl substituents, for example, methyl groups, and are referred to herein as branched acids. Saturated, branched organic acids are acids comprising at least one CH (methenyl) moiety and at least two CH3 (methyl) moieties. In one embodiment, for example, the longest carbon chain of the saturated, branched organic acid is substituted with one alkyl group having from C1 to C8. Another embodiment includes a saturated, branched organic acid, having from 6 carbon atoms to 24 carbon atoms, such as the C18 saturated branched organic acid, "iso-stearic acid," also known as isooctadecanoic acid or 16-methyl-heptadecanoic acid.

Unsaturated branched acids are acids comprising at least one carbon-carbon double bond, at least two CH3 (methyl) moieties and at least one CH (methenyl) moiety. The unsaturated branched acids may include any number of CH2 (methylene) groups, within the molecular weight limits set forth above. In one embodiment, the longest carbon chain of the unsaturated, branched organic acids is substituted with one C1 to C8 alkyl group. In another embodiment, the unsaturated, branched organic acid includes an acid having from 6 carbon atoms to 24 carbon atoms, such as the C18 monounsaturated methyl-branched organic acid known as "iso-oleic acid."

While it may be useful for the organic acids (and salts thereof) to have a low volatility when being melt-blended with the acid copolymer or ionomer, volatility has been found to not be limiting when preparing blends with high neutralization levels, particularly above 100%. At 100% neutralization (i.e., sufficient basic compound is added such that all acid moieties in the copolymer and organic acid are neutralized), or when the use of an excess of neutralizing agent results in a neutralization level that is even greater than 100%, the volatility of these components is not significant. Accordingly, organic acids with lower molecular weights, such as C4 and C6 acids, may be used. In one preferred embodiment, however, the organic acid (or salt) useful in the present invention is non-volatile and non-migratory. By "non-volatile", it is meant that the organic acid (or salt thereof) does not evaporate or sublimate significantly at temperatures of melt blending of the acid with the acid copolymer. By "non-migratory", it is meant that the acid does not bloom to the surface of the polymeric article under normal storage conditions at ambient temperatures.

In some embodiments, the thermoplastic composition comprises from 5 wt % to 60 wt %, from 20 wt % to 50 wt %, or from 20 wt % to 40 wt % of the at least one aliphatic, monofunctional organic acid, based on the total weight of thermoplastic composition.

The cations of the organic acid salts may be any of a wide variety of cations of the organic acid salts including, for example: the lithium, sodium, zinc, potassium, barium, bismuth, strontium, magnesium, aluminum or calcium salts of the organic acids. In preferred embodiments, magnesium salts or calcium salts are used in the present invention.

The combined acid moieties of the at least one ethylene acid copolymer and the at least one aliphatic, monofunctional organic acid are neutralized to a level generally in the range of from 25% to 220%. All individual values and subranges are included and disclosed herein. For example, in some embodiments, the combined acid moieties of the at least one aliphatic, monofunctional organic acid and the ethylene acid copolymer are neutralized to a level of from 25% to 220% in one embodiment; from 90% to 225% in another embodiment; from 90% to 200% in still another embodiment; from 90% to 175% in yet another embodiment; from 90% to 150% in even still another embodiment; and from 100% to 150% in even yet another embodiment. As previously described herein, 100% neutralization may be achieved when sufficient basic compound is added such that all acid moieties in the copolymer and organic acid are neutralized. When an excess amount of neutralizing agent is used, the neutralization level is even greater than 100%.

Cations useful in neutralizing the at least one aliphatic, monofunctional organic acid and the ethylene acid copolymer may include, for example, lithium, sodium, potassium, magnesium, aluminum, calcium, barium, or zinc, or combinations of such cations. In some embodiments, magnesium cations or calcium cations are used.

The thermoplastic composition may be produced by heating a mixture of the ethylene acid copolymer(s) or ionomer(s) thereof, the organic acid(s) or salt(s) thereof, and at least one basic compound capable of neutralizing the combined acid moieties of the ethylene acid copolymer and the organic acid. For example, the components of the composition may be mixed by melt-blending ethylene $\alpha,\beta$-ethylenically unsaturated C3 to C8 carboxylic acid copolymer(s) or ionomer(s) thereof as described above that are not neutralized to a level that renders them intractable (not melt-processible) with one or more organic acids as described above or salts thereof, and concurrently or subsequently adding an amount of a basic compound capable of neutralization of the acid moieties in the acid copolymer and in the organic acid that is sufficient to achieve neutralization levels of 25% to 220%.

This procedure need not employ an inert diluent such as a solvent. Treatment of acid copolymers and organic acids with basic compounds in this way enables the compositions described herein to be neutralized to a level higher than that which would result in loss of melt processability and properties for the ionomer alone. For example, an acid copolymer blended with organic acid(s) may be neutralized to a level greater than 90% in one embodiment, greater than 95% in another embodiment, and up to 100% in still another embodiment, or even greater than 100% in yet another embodiment.

The acid copolymer(s) or unmodified, melt-processible ionomer(s) may be melt-blended with the organic acid(s) or salt(s) and other polymers in any manner known in the art. For example, a salt and pepper blend of the components may be made and then melt-blended in an extruder. The melt-processible, acid copolymer/organic-acid-or-salt blend may be treated with the basic compound by methods known in the art, such as melt-mixing. For example, a Werner & Pfleiderer twin-screw extruder may be used to mix the acid copolymer and the organic acid and treat with the basic compound at the same time. It is desirable that the mixing be conducted so that the components are intimately mixed, allowing the basic compound to neutralize the acidic moieties.

The amount of basic metal compound capable of neutralizing acidic groups in the acid copolymer and the organic acid(s) may be determined by adding the stoichiometric amount of the basic compound calculated to neutralize a target amount of acid moieties in the acid copolymer and organic acid(s) in the blend (herein referred to as "% neutralization" or "% neutralized"). Thus, sufficient basic compound is made available in the blend so that, in aggregate, the indicated level of neutralization could be achieved. Neutralization levels in excess of 100% include those wherein basic compounds are included in amounts greater than the stoichiometric amounts calculated to neutralize all the carboxylic acid moieties in the acid copolymer and the organic acid.

Suitable basic compounds useful in the present invention include compounds of alkali metals, such as lithium, sodium or potassium, transition metal ions and/or alkaline earth metal and mixtures or combinations of such cations. The basic compounds include formates, acetates, nitrates, hydrogen carbonates, carbonates, oxides, hydroxides or alkoxides of the ions of alkali metals, and formates, acetates, nitrates, oxides, hydroxides or alkoxides of the ions of alkaline earth metals and transition metals. Basic compounds with magnesium or calcium ions, such as the corresponding formate, acetate, hydroxide, oxide, alkoxide, and the like; including magnesium hydroxide, are of note.

It is desirable to run the blending/neutralization process with an extruder equipped with a vacuum port to remove any excess volatiles including moisture. Moisture may have a negative impact on subsequent molding operations in that excess moisture and volatiles may create unwanted foaming and voids in the molded article.

The overall salt of the composition ("overall salt" is a number of moles that is equal to the total number of moles of carboxylate anions) comprises at least 75 eq % magnesium counterions or calcium counterions. While other cations may be present, the equivalent percentage of magnesium salts or calcium salts in the final blended ionomeric composition is at least 75 eq %, alternatively, at least 80 eq %, and alternatively, at least 90 eq % based on the total salt present in the blended composition.

The basic compound(s) may be added neat to the acid copolymer or ionomer thereof and the organic acid or salt thereof. The basic compound(s) may also be premixed with a polymeric material such as an acid copolymer, to form a "masterbatch" that may be added to the acid copolymer or ionomer thereof and the organic acid or salt thereof. A notable masterbatch comprising 40 wt % to 60 wt % of a copolymer of ethylene, acrylic acid or methacrylic acid, and optionally an alkyl acrylate wherein the alkyl group has from 1 carbon atom to 4 carbon atoms (C1 to C4); and 40 wt % to 60 wt % of a basic compound as described above (e.g., Mg(OH)2).

As previously described herein, some embodiments, described herein is a golf ball comprising (a) at least one core, (b) a cover, and optionally, (c) at least one intermediate layer positioned between the at least one core and the cover, wherein the at least one core or the at least one intermediate layer is made from a formulation that includes a cross-linked material as component (ii).

In a preferred embodiment, the formulation for a golf ball comprises from 5 wt % to 50 wt % of a cross-linked material having a gel content of at least 80 wt %, wherein the crosslinked material is a crosslinked elastomer, a crosslinked rubber, or blends thereof. Examples of suitable crosslinked elastomers and crosslinked rubbers may include natural and synthetic crosslinked rubbers including, but not limited to, crosslinked polybutadiene, crosslinked polyisoprene, crosslinked ethylene propylene rubber ("EPR"), crosslinked styrene-butadiene rubber, crosslinked styrenic block copolymer rubbers (such as SI, SIS, SB, SBS, SIBS, and the like, where "S" is styrene, "I" is isobutylene, and "B" is butadiene), crosslinked butyl rubber, crosslinked halobutyl rubber, crosslinked polystyrene elastomers, crosslinked polyethylene elastomers, crosslinked polyurethane elastomers, crosslinked polyurea elastomers, crosslinked metallocene-catalyzed elastomers and plastomers, crosslinked copolymers of isobutylene and para-alkyl styrene, crosslinked halogenated copolymers of isobutylene and para-alkyl styrene, crosslinked copolymers of butadiene with acrylonitrile, crosslinked polychloroprene, crosslinked alkyl acrylate rubber, crosslinked chlorinated isoprene rubber, crosslinked acrylonitrile chlorinated isoprene rubber, and combinations of two or more thereof.

In some embodiments, the crosslinked material is a crosslinked rubber, or alternatively, a crosslinked diene rubber. In other embodiments, the crosslinked material is a crosslinked polybutadiene, a crosslinked styrene-butadiene, and mixtures of crosslinked polybutadiene with other crosslinked elastomers, and wherein the amount of crosslinked polybutadiene present is at least 40 wt %, based on the total polymeric weight of the mixture. Exemplary crosslinked polybutadienes may include high-cis neodymium-catalyzed crosslinked polybutadienes and cobalt-, nickel-, or lithium-catalyzed crosslinked polybutadienes. Suitable examples of commercially available crosslinked polybutadienes include, but are not limited to, BUNA™ CB high-cis neodymium-catalyzed crosslinked polybutadiene rubbers, such as BUNA™ CB 23, high-cis cobalt-catalyzed crosslinked polybutadiene rubbers, such as BUNA™ CB 1220 and 1221, commercially available from LANXESS® Corporation; EUROPRENE® NEOCIS® BR 40 and BR 60, commercially available from Versalis S.p.A.; UBEPOL-BR® rubbers, commercially available from UBE Industries, Inc.; and BR01, commercially available from Japan Synthetic Rubber Co., Ltd.

The rubber composition may optionally include a curing agent. Suitable curing agents include, but are not limited to, sulfur; N-oxydiethylene 2-benzothiazole sulfenamide; N,N-di-ortho-tolylguanidine; bismuth dimethyldithiocarbamate; N-cyclohexyl 2-benzothiazole sulfenamide; N,N-diphenylguanidine; 4-morpholinyl-2-benzothiazole disulfide; dipentamethylenethiuram hexasulfide; thiuram disulfides; mercaptobenzothiazoles; sulfenamides; dithiocarbamates; thiuram sulfides; guanidines; thioureas; xanthates; dithiophosphates; aldehyde-amines; dibenzothiazyl disulfide; tetraethylthiuram disulfide; tetrabutylthiuram disulfide; and combinations thereof.

The rubber composition may also optionally contain one or more antioxidants. Antioxidants are compounds that can inhibit or prevent the oxidative degradation of rubber. Some antioxidants also act as free radical scavengers; thus, when antioxidants are included in the rubber composition, the amount of initiator agent used may be as high or higher than the amounts disclosed herein. Suitable antioxidants include, for example, dihydroquinoline antioxidants, amine type antioxidants, phenolic type oxidants and mixtures thereof.

The rubber composition may further contain one or more fillers to adjust the density and/or specific gravity of the core. Exemplary fillers include precipitated hydrated silica, clay, talc, asbestos, glass fibers, aramid fibers, mica, calcium metasilicate, zinc sulfate, barium sulfate, zinc sulfide, lithopone, silicates, silicon carbide, diatomaceous earth, polyvinyl chloride, carbonates (e.g., calcium carbonate, zinc carbonate, barium carbonate, and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), oxides (e.g., zinc oxide, tin oxide, iron oxide, calcium oxide, aluminum oxide, titanium dioxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, regrind (i.e., core material that is ground and recycled), nanofillers and combinations thereof. The amount of particulate material(s) present in the rubber composition is typically within a range having a lower limit of 5 parts by weight per 100 parts of the base rubber in one embodiment or 10 parts by weight per 100 parts of the base rubber in another embodiment; and an upper limit of 30 parts by weight per 100 parts of the base rubber in one embodiment, 50 parts by weight per 100 parts of the base rubber in another embodiment, or 100 parts by weight per 100 parts of the base rubber in still another embodiment. Filler materials may be dual-functional fillers, such as zinc oxide (which may be used as a filler/acid scavenger) and titanium dioxide (which may be used as a filler/brightener material).

The rubber composition may also contain one or more additives selected from processing aids, processing oils, plasticizers, coloring agents, fluorescent agents, chemical blowing and foaming agents, defoaming agents, stabilizers, softening agents, impact modifiers, free radical scavengers, accelerators, scorch retarders, and the like. The amount of additive(s) typically present in the rubber composition is typically within a range having a lower limit of 0 parts by weight per 100 parts of the base rubber, and an upper limit of 20 parts or 50 parts or 100 parts or 150 parts by weight per 100 parts of the base rubber.

The compositions may additionally comprise small amounts of optional materials including additives for use in polymeric materials. Examples of suitable additives include, without limitation, plasticizers, stabilizers including viscosity stabilizers and hydrolytic stabilizers, primary and secondary antioxidants such as for example IRGANOX 1010, ultraviolet ray absorbers and stabilizers, anti-static agents, dyes, pigments or other coloring agents, fire-retardants, lubricants, processing aids, slip additives, anti-block agents such as silica or talc, release agents, and/or mixtures thereof. Additional optional additives may include inorganic fillers as described below; acid copolymer waxes, such as for example Honeywell wax AC540; TiO2, which is used as a whitening agent; optical brighteners; surfactants; and other components known in the art of golf ball manufacture to be useful but not critical to golf ball performance and/or acceptance. Many such additives are described in the Kirk Othmer Encyclopedia of Chemical Technology, 5th edition, John Wiley & Sons (Hoboken, 2005).

The additives, when used in the composition, may be present in the compositions in quantities of from 0.01 wt % to 15 wt % in one embodiment, from 0.01 wt % to 10 wt % in another embodiment, or from 0.01 wt % to 5 wt % in still another embodiment based on the total composition, so long as the additives do not detract from the basic and novel characteristics of the composition; and so long as the additives do not significantly adversely affect the performance of the composition or golf ball prepared from the composition.

The optional incorporation of such conventional ingredients into the compositions may be carried out by any known process, for example, by dry blending, by extruding a mixture of the various constituents, by the conventional masterbatch technique, or the like.

Various optional fillers may be added to compositions to reduce cost, to affect rheological, mixing and physical properties such as density, flex modulus, hardness (e.g. Shore D), mold release, and/or melt flow index and the like, to increase or decrease weight, and/or to reinforce the material. The amount of filler employed is primarily a function of weight requirements and weight distribution of the golf ball. The fillers may be used to adjust the properties of a golf ball layer, reinforce the layer, or for any other purpose. For example, the compositions may be reinforced by blending with a wide range of density-adjusting fillers, e.g., ceramics, glass spheres (solid or hollow, and filled or unfilled), and fibers, inorganic particles, and metal particles, such as metal flakes, metallic powders, oxides, and derivatives thereof, as is known in the art.

Fillers may be used to modify the weight of the golf ball to meet required limits, by imparting additional density to compositions of the previously described components. Filler may be included in one or more layers of the golf ball, such as the core or intermediate layer(s), the selection being dependent upon the type of golf ball desired (i.e., two-piece, wound or multilayer), as more fully detailed below.

The filler may be inorganic, having a density from greater than 4 g/cc in one embodiment, greater than 5 g/cc in another embodiment, and from 4 g/cc to 10 g/cc in still another embodiment; and may be present in amounts between 0 wt % and 60 wt % based on the total weight of the composition. In a preferred embodiment, enough filler is used so that the ball has an overall density of 1.14 g/cc.

Examples of useful fillers include metals such as titanium, tungsten, aluminum, bismuth, nickel, molybdenum, iron, steel, lead, copper, brass, boron, boron carbide whiskers, bronze, cobalt, beryllium, zinc, tin, metal oxides including zinc oxide, iron oxide, aluminum oxide, tin oxide, titanium oxide, magnesium oxide, zinc oxide and zirconium oxide, as well as other well-known corresponding salts and oxides thereof. Other preferred fillers include barium sulfate, lead silicate, tungsten carbide, limestone (ground calcium/magnesium carbonate), zinc sulfate, calcium carbonate, zinc carbonate, barium carbonate, clay, tungsten, silicas, and mixtures of any of these. Preferably the filler material is non-reactive or almost non-reactive. Of note are barium sulfate and tungsten powder fillers. Crystalline tungsten powder having a specific gravity of 19.3 g/cc is available from Alldyne Powder Technologies, Kulite Tungsten Corporation or Buffalo Tungsten Incorporated.

Fillers may be employed in a finely divided form, for example, in a size less than 20 mesh U.S. standard size in one embodiment, and from 100 mesh to 1,000 mesh in another embodiment; except for fibers and flock, which may be elongated. Flock and fiber sizes are desirably small enough to facilitate processing. Filler particle size may depend upon desired effect, cost, ease of addition, and dusting considerations.

When filler is used in a particular composition, the coefficient of restitution (COR), as described below, will decrease roughly proportionally to the volumetric displacement of the polymer by the filler. For example, if 5 vol % of filler is used to provide a desired specific gravity, then the COR of a sphere made from the filled composition may be 95% of the COR of a comparable sphere made from the unfilled composition. When tungsten is used as a filler with the compositions described herein, the COR of a sphere of 1.53 inch (3.89 cm) in diameter may decrease 0.015 inch to 0.020 inch (0.38 mm to 0.51 mm) compared to a sphere of the same size prepared from the corresponding unfilled composition, depending on the amount of tungsten that is present in the filled composition.

The compositions may be foamed by the addition of at least one physical or chemical blowing or foaming agent or by blending with polymeric, ceramic, metal, and glass microspheres. The use of a foamed polymer allows the golf ball designer to adjust the density or mass distribution of the ball to adjust the angular moment of inertia, and thus, the spin rate and performance of the ball. Foamed materials also offer a potential cost savings due to the reduced use of polymeric material.

Blowing or foaming agents useful in the present invention include, but are not limited to, organic blowing agents, such as azobisformamide; azobisisobutyronitrile; diazoaminobenzene; N,N-dimethyl-N,N-dinitroso terephthalamide; N,N-dinitrosopentamethylene-tetramine; benzenesulfonyl-hydrazide; benzene-1,3-disulfonyl hydrazide; diphenylsulfon-3-3, disulfonyl hydrazide; 4,4'-oxybis benzene sulfonyl hydrazide; p-toluene sulfonyl semicarbizide; barium azodicarboxylate; butylamine nitrile; nitroureas; trihydrazino triazine; phenyl-methyl-uranthan; p-sulfonyhydrazide; peroxides; and inorganic blowing agents such as ammonium bicarbonate and sodium bicarbonate. A gas, such as air, nitrogen, carbon dioxide, etc., may also be injected into the composition during the injection molding process.

A foamed composition may be formed by blending microspheres with the composition either during or before the molding process. Polymeric, ceramic, metal, and glass microspheres up to 1,000 μm in diameter are useful, and may be solid or hollow and filled or unfilled.

Of note is an article comprising a foamed composition, such as a ball comprising a core or center prepared from the foamed composition. In addition to golf balls, such balls include baseballs and softballs. Either injection molding or compression molding may be used to form a layer or a core including a foamed polymeric material.

The compositions described herein may be injection molded or compression molded into various shaped articles, including cores or intermediate layers for golf balls as described below. For example, but without limitation, injection molding conditions may include temperatures, pressures and cycle times as indicated in Table A.

TABLE A

| Melt Temperature (° C.): | 160-260 |
| Mold Temperature (° C.): | 10-30 |
| Injection Pressure (mPa): | Packing: 25-180 |
| | Hold: 5-15 |
| Cycle Times (s): | Filling and Packing: 40-90 |
| | Holding: 15-30 |
| | Cooling Time: 50-100 |
| | Screw Retraction: 5-50 |

The formulation and compositions described herein may be used with any type of ball construction. For example, the compositions may be used in the core, cover, or one or more intermediate layers of a golf ball.

Suitable golf ball constructions, including one-piece golf balls, two-piece golf balls, three-piece golf balls and multi-piece golf balls, are described in U.S. patent application Ser. No. 12/261,331, filed on Oct. 30, 2008, and in the references cited therein. The composition described herein may be used in any of the golf balls in which the composition described in the above U.S. patent application Ser. No. 12/261,331 can be used. Of note, however, are golf balls comprising a cover prepared from a polyurethane or polyurea composition, and a core or intermediate layer prepared from the formulation as described herein; golf balls comprising a cover prepared from an ionomer composition, and a core or intermediate layer prepared from the formulation as described herein; two-piece golf balls comprising a cover prepared from a polyurethane or polyurea composition, and a core prepared from the composition as described herein; two-piece golf balls comprising a cover prepared from an ionomer composition, and a core prepared from the composition as described herein; wound golf balls having a cover comprising or prepared from a polyurethane or polyurea composition, and a core or intermediate layer prepared from the formulation as described herein; wound golf balls having a cover comprising an ionomer or prepared from an ionomer composition, and a core or intermediate layer prepared from the formulation as described herein.

Also of note are multi-piece golf balls having any one or more of the following:

(1) a core comprising the composition as described herein, with or without filler, with a cover made of any composition known in the art to be useful as a cover;

(2) a core comprising the composition as described herein, with or without filler, used in a multilayer golf ball core with at least one mantle (i.e., one or more layers in between the innermost core and the outermost cover layer) with or without filler, and a cover made of any composition known in the art to be useful as a cover;

(3) a core made of any composition (including thermoset compositions such as polybutadiene rubber), with or without filler with an intermediate layer comprising the formulation as described herein, with or without filler;

(4) a cover prepared from a polyurethane composition; and a core prepared from the formulation as described herein, further comprising at least one additional intermediate layer;

(5) a cover prepared from an ionomer composition, and a core prepared from the formulation as described herein, further comprising at least one additional intermediate layer;

(6) a cover prepared from a polyurethane composition, and a core, further comprising at least one additional intermediate layer prepared from the formulation as described herein; and (7) a cover prepared from an ionomer composition, and a core, further comprising at least one additional intermediate layer prepared from the formulation as described herein.

The golf balls of note may optionally comprise one or more fillers, as described above. The filler may be used in the core and not in the mantle, in the mantle and not in the core, or in both the core and the mantle.

Furthermore, properties such as hardness, modulus, compression, resilience, core diameter, intermediate layer thickness and cover thickness of golf balls have been found to affect play characteristics such as spin, initial velocity and feel of golf balls. Depending on the construction and desired characteristics of the golf ball, the core, intermediate layers, and cover may have different resilience, compression or hardness to achieve desired performance characteristics. The compositions described herein may be useful in preparing golf balls with resilience, compression or hardness gradients within a golf ball. The selection of materials for performance based on these criteria is also described at length in the above U.S. patent application Ser. No. 12/261,331 and in the references cited therein.

In particular, however, the golf balls described herein are characterized by a high initial velocity and a high COR. More specifically, the compositions described herein provide tailored resiliency as indicated by the COR. COR125 may be measured by firing a sphere that is 1.50 inch (3.81 cm) to 1.68 inch (4.27 cm) in diameter at an initial velocity of 125 feet/second (38.1 m/s) against a steel plate positioned 3 feet (0.914 m) from the point where initial velocity is determined and dividing the velocity of rebound from the plate by the initial velocity. One may also measure COR at several initial velocities, develop a correlation and determine a COR at a specified initial velocity based on the correlation. COR may be determined on a sphere prepared from a single composition or a sphere having two or more layers (for example, a finished golf ball). One skilled in the art will recognize that COR cannot be greater than 1.0.

The compositions described herein are highly resilient, that is, the compositions exhibit high COR values. For spheres prepared from the composition without filler, the compositions provide COR measurements from 0.86 or higher in one embodiment, and from 0.86 to 0.90 in another embodiment when measured according to the COR Method described herein. Any COR value within the above ranges may be considered as "high COR". As indicated above, the presence of filler reduces the COR roughly proportional to the reduction in volume of the resin fraction of the volume of a test sphere. Compositions described herein, when containing filler, have a COR value of 0.83 or greater in one embodiment, and from 0.83 to 0.86 in another embodiment.

For a solid test sphere prepared from a single composition, the COR will depend on a variety of characteristics of the composition, including the composition's hardness. COR will generally increase as hardness is increased. In a two-piece solid golf ball with a core and a cover, one of the purposes of the cover is to produce a gain in COR over that of the core. When the contribution of the core to high COR is substantial, a lesser contribution is required from the cover. Similarly, when the cover contributes substantially to high COR of the ball, a lesser contribution is needed from the core.

Moreover, the compositions described herein have a Shore D hardness of at least 30, in one embodiment, and a Shore D hardness of from 40 to 60 in another embodiment, as measured on a formed sphere. In still another embodiment, the compositions have a Shore D hardness of from 50 to 65, as measured on a standard test plaque. In addition, the compositions described herein have a flexural modulus of 15,000 psi (103.4 mPa) to 30,000 psi (206.8 mPa) in one general embodiment.

The thermoplastic compositions described herein may be useful in a wide range of objects other than, mantles, intermediate layers, cores, and centers of golf balls. As previously discussed, the compositions, and optionally foamed compositions, may be used as cores for balls other than golf balls. The compositions also may be useful in other sporting equipment applications, particularly in golf shoe cleats, components of golf clubs such as golf club face plates or inserts, molded golf club heads, club head coatings or casings, and fillers for inner cavity of a golf club head, and the like. The compositions may also be used in place of materials taught in the art for use in club faces, such as poly-imides reinforced with fillers or fibers, methyl (meth) acrylate copolymers, carbon-fiber reinforced polycarbonate, materials based on polymethyl methacrylate (PMMA) and crosslinkable monomers, and cross-linked synthetic rubber. The composition may also be substituted for the cured acrylic monomer, oligomer, polymer used to impregnate wood club heads, for rubber-like elastic cores in club heads, and for molded polyurethane club heads. As such, golf club heads may be prepared having a front striking face adapted to strike a ball and an insert mounted on the striking face, said insert comprising a molded article comprising the composition above. In addition, golf club heads comprising a metal body and an insert plate secured to the forward striking surface of the metal body and made of the composition above laminated with an outer metal layer formed with grooves. In addition, the present invention also includes a golf club having a shaft with a club head affixed to the shaft, wherein the club head is described above, having a component comprising the composition above.

The composition may also be useful for preparing molded articles that are footwear structural components, provide shape support for footwear construction, such as heel counters, toe puffs, soles and cleats. "Heel counter" as used herein refers to a stiff, curved piece that provides shape and structure to the heel area of a shoe. "Toe puff" or "toe box" as used herein refers to a stiff, arched piece that provides shape and structure to the toe area of a shoe. "Sole" as used herein refers to a stiff, generally flat piece that provides shape and structure to the bottom of a shoe. These structural components may be incorporated into the internal structure of the shoe and covered with additional components for wear and/or appearance.

The composition described herein may also be useful in non-sporting good applications such as caulking materials, sealants, modifiers for cement and asphalt, and coatings. The compositions may also be useful in toys, decorative objects, and containers for inert materials.

Some of the advantages and benefits of making and using the formulation to construct the golf ball structures of the present invention, can include, for example: (1) providing a golf ball having a lower frequency sound, and (2) providing a golf ball having a lower sound pressure level.

The sound characteristics of a golf ball, such as frequency range, when the golf ball is struck by a golf club can be measured by testing methods known in the art such as a method described in U.S. Pat. No. 7,163,471B2 and U.S. patents cited therein (U.S. Pat. Nos. 5,971,870, 6,425,833, 6,142,866 and 6,152,835). These patents disclose that a golf ball made of a particular material has a primary minimum value in a frequency range of 3,100 Hz or less. What causes the audible sound emitted from a golf ball when the golf ball is struck by a golf club and how that sound is measured, is explained in the above patents generally as follows:

The deformation of the golf ball diameters between extension and contraction defines an oscillation (or pressure pulse) that vibrates against air molecules. The vibration of the air molecules is, in effect, the sound that is heard by the human ear. The contraction and extension of the golf ball is greatest along the primary diameter and second diameter, because the primary diameter is tangent to where the ball is struck. Because the primary and secondary diameters oscillate more than any other diameters of the golf ball, the oscillation of the primary and secondary diameters define the first acoustic mode which generates the most audible pressure pulse. For that reason, it is generally the first, second, and sometimes third, acoustic modes that are the most important acoustic modes exhibited by a golf ball being struck. The first acoustic mode is typically called the primary value and typically has a frequency lower than 3,100 kilohertz.

Also, altering the frequency of the first acoustic mode will alter the frequency of the remaining acoustic modes. Thus, lowering the frequency of the first acoustic mode will lower the frequency of the second and third acoustic modes, so that the overall sound detected has a lower frequency.

Another way to measure sound with respect to golf ball constructions and materials is to primarily rely on decibel levels. The decibel level includes all of the acoustic modes and is a function of how much sound is emitted from the material of a golf ball when the golf ball is struck. Decibels are converted from Pascals, which indicate the magnitude and duration of the pressure pulse associated with the sound. A ball emitting a smaller pressure pulse (lower Pascal output) will give the impression of a softer feeling.

In addition, as stated earlier, golf balls having a high pitch or high acoustic output are viewed as too hard, while balls having a low pitch or low acoustic output are perceived as a ball having a short flight distance. This perception holds true regardless of the actual mechanical properties of the golf ball in question. Therefore, a method to adjust the frequency or Pascal output for golf balls, while retaining the COR of the golf balls is a beneficial objective of the present invention. In other embodiments, golf balls including such features, would also be an advantage.

The present invention includes a method of shifting the sound pressure level and/or the frequency of golf ball materials of construction to provide new and improved golf balls having a specific first acoustic mode having a downward frequency shift. The improved golf ball of the present invention is produced by constructing a core and/or one or more cover layers for the golf ball from a sound-altering composition or formulation. The golf balls within the scope of the present invention can be solid, wound, two-piece, or multi-layered golf balls.

Some of the advantageous/beneficial properties exhibited by golf ball product produced as described herein, can include, for example: (1) the post-impact sound of the golf ball being impacted by a golf club can be "tuned" to meet a specified pitch, tone, color, loudness and duration, (2) the golf ball can have louder and crisper sounds, (3) the golf balls can have a good tactile sensation at impact; (4) a golf impact sound is typically at frequencies above 1 kHz and the duration of the sound can range from a few milliseconds with heavily damped clubheads to tens of milliseconds with lightly damped, hollow, metal clubheads; which is usually shorter than the 250 ms required by the auditory system to detect sound characteristics accurately. In the present invention, the sound frequencies can be adjusted to fall within a range of from 2.9 kHz to 3.6 kHz which is a frequency range found to be similar to the sound from a hollow metal driver such as in the range of from 5 kHz to 11 kHz. The sound frequencies of the golf impact are generally better than the frequencies of a traditional wooden driver, which typically does not exceed 3.5 kHz; (5) the level, bandwidth, frequency content and duration of the loudness of the sound is perceived well by a golfer; (6) the time in sharpness from the point of hitting the golf ball to 60 ms later was good; (7) the impact sounds from a golf ball are typically short in duration and the impact sounds can contain a broad range of frequencies (mainly between 2.9 kHz and 4.5 kHz whilst the instantaneous sound pressure level, measured at the ear, can reach peaks of up to 120 dB; (8) a golfer's perceived qualities of a golf ball, such as loudness, pitch, timbre, duration, sharpness, volume and density are typically perceived as good qualities by tuning the acoustic pressure and the frequency content of the sound; (9) previous studies have found that, for impulsive sounds shorter than 100 ms to 200 ms, the loudness reduces progressively as the duration of the sound is decreased; and studies indicate that below approximately 200 ms, an increase of 3 dB in sound pressure level is necessary to maintain the same loudness when the pulse duration is halved. In the present invention, the loudness of the sound is from 109 to 115 dB; (10) the sound sharpness (i.e. a sound that is a distinct sensation and that contributes to tone color) is another property that can be improved in the present invention; (11) the present invention has a "good feel". The terms 'hard' and 'soft' are other popular descriptors used by the golfers to describe the feel from impact on the golf ball. The hardness of feel can be associated with the type of clubhead used and/or the ball construction but the overall pleasantness of feel is improved with the golf ball of the present invention; and (12) increasing the duration of the impact can decrease the speed at which the ball leaves a clubhead. In the present invention "duration" refers to the duration of the sound event; and when the ball does not compress as much by the clubhead, less compression reduces the impact duration and concurrently increases the post-impact ball speed.

In a preferred embodiment, the formulation to make the golf ball structures of the present invention, can be used to produce a golf ball having a core, one or more intermediate layers encasing the core, and one or more cover layers encasing the core or encasing the intermediate layer(s), wherein at least the core or at least one of the one or more intermediate layers comprise the formulation described above. The composition of the present invention formulated to alter the sound produced when the golf ball is struck without substantially altering the golf balls hardness and compression or other mechanical properties of the golf ball. For example, the golf ball exhibits a ball resiliency ($COR_{125}$) of from 0.650 to 0.830 in one embodiment, from 0.700 to 0.820 in another embodiment, and from 0.760 to 0.816 in still another embodiment measured at a velocity of 125 ft/s (38.1 m/s). The golf ball also exhibits a ball compression of from 0 PGA (Atti) to 120 PGA (Atti) in one embodiment, from 50 PGA (Atti) to 115 PGA (Atti) in another embodiment, and from 79 PGA (Atti) to 113 PGA (Atti) in still another embodiment. In addition, the golf ball produced from the formulation of the present invention, exhibits a downward ball frequency shift of from 3,750 Hz to 3,275 Hz in one embodiment, from 3,408 Hz to 3,025 Hz in another embodiment, and from 3,650 Hz to 3,300 Hz in still another embodiment. And the sound pressure level shift of the golf ball is from 112.7 dB to 109.2 dB in one embodiment, from 113.3 dB to 111.2 dB in another embodiment, and from 113.2 dB to 111.2 dB in still another embodiment.

In other embodiments, the frequency shift of the core of the present invention, in terms of percentages, is at least −10% (minus 10 percent) in one general embodiment, at least −25% in another embodiment, and from −10% to −50% in still another embodiment. And, the sound pressure level shift of the core, in terms of percentages, is at least −25% in one general embodiment, at least −45% in another embodiment, and from −25% to −50% in still another embodiment.

In still other embodiments, the frequency shift of the golf ball of the present invention, in terms of percentages, is at least −30% in one general embodiment, at least −40% in another embodiment, and from −30% to −50% in still another embodiment. And, the sound pressure level shift of the golf ball, in terms of percentages, is at least −25% one general embodiment, at least −35% in another embodiment, and from −25% to −50% in still another embodiment.

EXAMPLES

The following examples are provided to describe the present invention in further detail. These examples, which set forth a preferred mode presently contemplated for carrying out the present invention, are intended to illustrate and not to limit the present invention.

Various terms and designations used in the Inventive Examples (Inv. Ex.) and the Comparative Examples (Comp. Ex.) which follow are explained hereinbelow:

"MB" stands for masterbatch.
"BMI" stands for bimodal ionomer.
"FAMI" stands for fatty acid modified ionomers.
"MI" stands for melt index.
"COR" stands for coefficient of restitution.
"$COR_{125}$" stands for COR @125 feet per second (38.1 m/s).
"$COR_{180}$" stands for COR @180 feet per second (54.9 m/s).
"n/a" stands for not applicable.
"PBR" stands for polybutadiene rubber.
"AA" stands for acrylic acid.
"MAA" stands for methacrylic acid.
"n-BA" stands for n-butyl acrylate.
"ION" stands for ionomer.
"SG" stands for specific gravity.
"A/O" stands for antioxidant.
"E" stands for ethylene.
"SPL" stands for sound pressure level.

Various ingredients, components, additives, or raw materials used in the Inv. Ex. and the Comp. Ex. which follow are explained hereinbelow in Table I:

TABLE I

| Raw Materials | | |
|---|---|---|
| Material | Brief Description | Supplier |
| INDUSTRENE 106 | A commercial grade oleic acid. | Chemtura Industries (now PMC Biogenix Inc.) |
| JARIC 22:1 | An erucic acid. | Jarchem Industries Inc. |
| Prifrac 2990 | An erucic acid. | Uniqema (now Croda-Uniqema) |
| Bara 200 | A filler: $BaSO_4$. | Cimbar Performance Materials |
| IRG B 215 | A 2:1 phosphite/phenolic antioxidant blend. | BASF |
| IRG 1010 | A phenolic antioxidant. | BASF |

Testing Criteria

COR is measured by firing an injection-molded neat sphere of the resin having the size of a golf ball or a multilayer sphere having a diameter of 1.55 inch (3.94 cm) out of an air cannon at several velocities over a range of roughly 60 feet per second (18.3 m/s) to 180 feet per second (54.9 m/s). The spheres struck a steel plate positioned three feet away from the point where initial velocity is determined, and rebounded through a speed-monitoring device located at the same point as the initial velocity measurement.

EAC-4: An ethylene/acrylic acid/n-BA terpolymer with 10.5 wt % of AA and 15.5 wt % of n-BA, with a MI of 60 g/10 min.

EAC-5: An ethylene/acrylic acid copolymer with 5.0 wt % of AA with an effective MI of 10,000 g/10 min.

WAX-1: An ethylene/acrylic acid copolymer wax with an acid number of 40 mg KOH per gram according to ASTM D1386 and commercially available from Honeywell as AC540.

The materials designated MB-1, BMI-1, FAMI-1, and FAMI-2 are described in Table III.

TABLE II

Testing Materials

| Material Designation | Composition | Melt Index (dg/min @ 190° C.) | Viscosity (mPa · s @ 140° C.) |
|---|---|---|---|
| EAC-1 | E/6.2 wt % AA/28 wt % nBA | 60 | |
| EAC-2 | E/6.2 wt % AA/28 wt % nBA | 200 | |
| EAC-3 | E/6.2 wt % AA/28 wt % nBA | 300 | |
| EAC-4 | E/10.5 wt % AA/15.5 wt % nBA | 60 | |
| WAX-1 | Ethylene/acrylic acid wax. | | 575 mPa · s |

TABLE III

Testing Materials

| Material Designation | EAC-1 (wt %) | EAC-2 (wt %) | EAC-3 (wt %) | EAC-4 (wt %) | WAX-1 (wt %) | Oleic Acid (wt %) | MB-1 (wt %) | Mg(OH)$_2$ (wt %) | % Neutralized |
|---|---|---|---|---|---|---|---|---|---|
| MB-1 | | | 50.0 | | | | | 50.0 | |
| BMI-1 | | 76.1 | | | | 20.0 | 3.9 | | 83.0% |
| FAMI-1 | 52.2 | | | | | 35.0 | 12.8 | | 150.0% |
| FAMI-2 | | | | 52.8 | | 35.0 | 12.2 | | 100.0% |

The COR of each measurement is determined as the ratio of rebound velocity to initial velocity. The individually determined COR measurements are plotted as a function of initial velocity, and COR at a given fps (i.e. COR150) is determined by linear regression.

As used in the Examples below, "MI" refers to melt index as determined according to ASTM D1238 at 190° C. using a 2,160 g weight; and with values of MI reported in units of g/10 min.

"Atti Compression" is measured using an "Atti" testing device according to standard procedures for that instrument. For accurate comparison of compression data, the diameter of the balls is corrected to 1.68 inch (4.27 cm) diameter using accepted methods, such as shimming.

The polybutadiene rubber (PBR) core materials used for testing in the Examples are available from Wilson Sporting Goods; are described in Tables II and III; and are identified as follows:

EAC-1: An ethylene/acrylic acid/n-butyl acrylate (n-BA) terpolymer with 6.2 wt % of AA and 28.0 wt % of nBA, with a MI of 60 g/10 min.

EAC-2: An ethylene/acrylic acid/n-BA terpolymer with 6.2 wt % of AA and 28.0 wt % of n-BA, with a MI of 200 g/10 min.

EAC-3: An ethylene/acrylic acid/n-BA terpolymer with 6.2 wt % of AA and 28.0 wt % of n-BA, with a MI of 300 g/10 min.

General Procedure for Preparing Organic Acid Modified Ionomer Blends

Employing a Werner & Pfleiderer twin screw extruder, organic acid, an ethylene acid copolymer, and neutralizing agent (MB-1 and/or Mg(OH)2 were melt blended. The amounts of the acid and copolymer were added so that the resulting blend contained 20 wt % to 40 wt % of the organic acid. The blend was treated with sufficient MB-1 and/or Mg(OH)2 so that the acid moieties of the organic acid and the acid copolymer were neutralized to the level indicated in Table III.

The "% neutralization" of the ionomer blends was readily calculated, as is known in the art. For example, as described in U.S. Pat. Nos. 8,044,136 and 8,202,925, the amount of base required to neutralize the acidic groups in the acid copolymer and the organic acid(s) may be determined by stoichiometric principles based on the total amount of acid groups present in the terpolymer(s) and the organic acid(s); and the amount of Mg(OH)2 added to the thermoplastic composition. The amount of acid moieties in the acid copolymer and organic acid(s) in the blend that is targeted for reaction with the base is referred to as "% nominal neutralization" or "% nominally neutralized". Thus, sufficient basic compound, such as the amount of Mg(OH)2, is added to the thermoplastic composition blend so that, in aggregate, the indicated level of nominal neutralization may be achieved. The total amount of acid groups includes the acid groups in the polymer carrier in the masterbatch, if a masterbatch is used.

General extrusion conditions for making the blends identified in Table III are shown in Table IV for the twin-screw extruder used and the various zone sections of the extruder.

TABLE IV

Extruder Parameters

| Parameter Measured | Zone 1 | Zone 2-4 | Zone 5 | Die | Melt |
|---|---|---|---|---|---|
| Temperature, ° C.: | 140-180 | 265-275 | 255-265 | 200-220 | 255-275 |
| Vacuum, inches (mm Mg): | 28 (711) | | | | |
| Screw Speed, rpm: | 175-250 | | | | |
| Total rate, pounds/hour (kg/hr): | 15-25 (6.8-11.3) | | | | |

Description of Rubber Cores

A core designated as "C69" is a soft rubber core (typically an orange colored core) having a diameter of 1.55 inch (3.94 cm); and a core designated as "C74" is a hard commercial polybutadiene rubber (PBR) core (typically a white colored core) having a diameter of 1.52 inch (3.86 cm). The above cores are used as received from the supplier.

General Procedure for Grinding Rubber Cores

Commercially-available rubber cores are immersed in liquid nitrogen to cool them prior to chopping. Many cores split on cooling. The pieces of cooled cores are dropped into the grinding chamber of a Conair cutter equipped with a 0.25-inch (6.35-mm) diameter screen and chopped. The chopped cores are collected in a nylon mesh bag. The chopped cores are then ground in a Bantam micropulverizer fitted with a 0.5 mm serrated screen and an auto-feeder. A slow trickle of liquid nitrogen is used to control the heat that is developed during grinding. The chopped cores are ground to pass through a specified mesh size and the resulting grounds are collected in a nylon mesh bag. Moisture is picked up during processing. The chopped cores ground, screened and collected are identified with the following designations:

(1) "C69-18" refers to soft cores that are ground to pass through an 18-mesh screen;
(2) "C69-35" refers to soft cores that are ground to pass through a 35-mesh screen; and
(3) "C74-35" refers to hard cores that are ground to pass through a 35-mesh screen.

The above cores are used in the Examples and are described further in Table V.

The ground materials are dried before compounding with the organic acid modified ionomer compositions.

Additional cores of each type are not ground and are used as cores for comparison with the cores of organic acid-modified ionomer compounded with ground core material.

General Procedure for Compounding

All materials are compounded on a 30-mm diameter Werner & Pfleiderer twin-screw extruder with screws having a L/D ratio of 30:1 at 200 rpm.

The temperature settings, in ° C., for the barrel zones of the extruder are as follows:

| Barrel Zone No.: | 1 | 2 | 3 | 4 | 5 | 6 | 7 | 8 | Die |
|---|---|---|---|---|---|---|---|---|---|
| Temperature, ° C.: | 190 | 200 | 200 | 200 | 200 | 180 | 180 | 180 | 180 |

Ktron gravimetric feeders are used to feed the materials. Resin is fed in the rear and ground rubber is fed through a side feeder. All materials in the feeding hoppers are under a nitrogen purge. The total of all feeds is 20 pounds/hour (9.07 kg/hr). A water bath of 25° C. water bath is used to quench the compounds and a Conair cutter is used to pelletize the compounds. All compounds are dried with a nitrogen purge overnight.

General Procedure for Core Molding

The thermoplastic compositions summarized in Table III are molded into spheres 1.55 inch (3.94 cm) in diameter using a Nissie FN 4000 horizontal injection molding machine, equipped with a 197-ton (197-Mg) clamp. The thermoplastic compositions are fed into the machine using a general purpose 45-mm single screw and 9.6-ounce (271.7-g) barrel.

The temperature settings, in ° C., for the barrel sections of the 45-mm single screw are as follows.

| Barrel Section: | Rear | Middle | Front | Nozzle |
|---|---|---|---|---|
| Temperature, ° C.: | 190 | 205 | 205 | 195 |

The screw rpm is 50, back pressure is 4.5 MPa, fill time is 10 s, packing time is 55 s, packing pressure is 65 MPa, and cooling time is 75 s. The mold temperature is 21° C.

Examples 1-8 and Comparative Examples A-D

The compositions of the Inventive Examples (Inv. Ex.) 1-8 and the Comparative Examples (Comp. Ex.) A-D described in Table V, were prepared and tested using the general procedures described above. In Table V, the IRG B215 in the compositions is an antioxidant blend of 67% tris(2,4-ditert-butylphenyl) phosphite and 33% pentaerythritol tetrakis[3-[3,5-di-tert-butyl-4-hydroxyphenyl]propionate]. The chopped cores ground, screened, and collected are identified above with the designations: C69-18, C69-35, and C74-35.

TABLE V

Core Compositions

| Example No. | Material Type | Material Designation | SG Modifier | Sound Modifier % | Sound Modifier Type | A/O | Nominal Diameter. (inch) | Nominal Diameter. (mm) | Nominal Weight (g) |
|---|---|---|---|---|---|---|---|---|---|
| Comp. Ex. A | PBR | C74 | | | n/a | n/a | 1.520 | 38.6 | 35.5 |
| Comp. Ex. B | PBR | C69 | | | n/a | n/a | 1.550 | 39.4 | 36.7 |
| Inv. Ex. 1 | Thermoplastic | FAMI-1 | $BaSO_4$ | 30% | C74-35 | IRG B215 | 1.550 | 39.4 | 37.5 |
| Inv. Ex. 2 | Thermoplastic | FAMI-1 | $BaSO_4$ | 15% | C74-35 | IRG B215 | 1.550 | 39.4 | 37.5 |
| Inv. Ex. 3 | Thermoplastic | 1:1 blend of FAMI-1:FAMI-2 | $BaSO_4$ | 30% | C74-35 | IRG B215 | 1.550 | 39.4 | 37.5 |
| Inv. Ex. 4 | Thermoplastic | 1:1 blend of FAMI-1:FAMI-2 | $BaSO_4$ | 30% | C74-35 | None | 1.550 | 39.4 | 37.5 |
| Inv. Ex. 5 | Thermoplastic | 1:1 blend of FAMI-1:FAMI-2 | $BaSO_4$ | 50% | C69-35 | IRG B215 | 1.550 | 39.4 | 37.5 |
| Inv. Ex. 6 | Thermoplastic | 1:1 blend of FAMI-1:FAMI-2 | $BaSO_4$ | 30% | C69-18 | IRG B215 | 1.550 | 39.4 | 37.5 |
| Inv. Ex. 7 | Thermoplastic | 1:1 blend of FAMI-1:FAMI-2 | $BaSO_4$ | 30% | C69-35 | IRG B215 | 1.550 | 39.4 | 37.5 |
| Inv. Ex. 8 | Thermoplastic | 1:1 blend of FAMI-1:FAMI-2 | $BaSO_4$ | 15% | C69-35 | IRG B215 | 1.550 | 39.4 | 37.5 |
| Comp. Ex. C | Thermoplastic | FAMI-1 | $BaSO_4$ | | None | None | 1.550 | 39.4 | 37.5 |
| Comp. Ex. D | Thermoplastic | 1:1 blend of FAMI-1:FAMI-2 | $BaSO_4$ | | None | None | 1.550 | 39.4 | 37.5 |

The specific gravity (SG) modifier described in Table V above is used to adjust the specific gravity of the thermoplastic cores to achieve the nominal weight.

General Procedure for Cover Molding

All covers are overmolded onto the thermoplastic spheres described above using an Engle ES330/125 vertical molding machine using retractable pin molding, equipped with a 125-ton (125-Mg) clamp. The compositions are fed to the machine using a general purpose 40-mm single screw and 6.5-ounce (183.9-g) barrel.

The temperature settings, in ° C., for the barrel sections of the 40-mm screw is as follows:

| Barrel Section: | Rear | Middle | Front | Nozzle |
|---|---|---|---|---|
| Temperature, ° C.: | 195 | 225 | 225 | 190 |

The screw rpm is 40, back pressure is 1.4 MPa, fill time is 0.75 s, packing time is 30 s, packing pressure is 120 MPa, and cooling time is 30 s. The mold temperature is 21° C. All cover layers are nominally 0.065 inch (1.65 mm) thick, except for the balls made for the cores of Comp. Ex. A where the cover thickness of such cores was a nominal 0.080 inch (2.03 mm) thick.

The cover compositions used in the Examples are described in Table VI; and identified as follows:

ION-1: An ethylene/methacrylic acid dipolymer with 15 wt % MAA, neutralized to 30% with sodium hydroxide, and having a MI of 2.8 g/10 min.

ION-2: An ethylene/methacrylic acid dipolymer with 15 wt % MAA, neutralized to 59% with zinc oxide, and having a MI of 0.7 g/10 min.

ION-3: An ethylene/methacrylic acid/n-BA terpolymer with 9 wt % MAA and 23 wt % n-BA, neutralized to 49% with MB-1, MI of 1.0 g/10 min.

MB-1: A $Mg(OH)_2$ concentrate with 50 wt % $Mg(OH)_2$ in 50 wt % EAC-3.

MB120-1 is 50% SURLYN™ 1702 and 50% $TiO_2$ by weight. In general, MB120-1 is produced by melt blending SURLYN™ 1702 with 50 wt % $TiO_2$ on a 30-mm diameter Werner & Pfleiderer twin-screw extruder with screws having a L/D ratio of 30:1 at 200 rpm and melt temperature of approximately 230° C.

TABLE VI

Cover Compositions

| Ingredient | Soft Cover (parts) | Hard Cover (parts) |
|---|---|---|
| BMI-1 | 100 | — |
| ION-1 | — | 40 |
| ION-2 | — | 40 |
| ION-3 | — | 20 |
| MB 120-1 | 5 | 5 |
| Total | 105 | 105 |

For the procedure used in the Examples, three golf balls of a two-layer golf ball type were tested and the same three golf balls were used in each Example. The properties of cores tested are described in Table VII.

TABLE VII

Core Properties

| Example Number | Core Resilience COR 125 | Core Resilience % Change | Core Resilience COR 180 | Core Resilience % Change | Core Compression PGA (Atti) | Core Compression % Change |
|---|---|---|---|---|---|---|
| Example Set VII-1 | | | | | | |
| Comp. Ex. A | 0.786 | | 0.707 | | 73.5 | |
| Inv. Ex. 1 | 0.769 | 0.8% | 0.681 | 1.4% | 72.6 | −2.5% |
| Inv. Ex. 2 | 0.766 | 0.3% | 0.677 | 0.7% | 72.4 | −2.7% |
| Comp. Ex. C | 0.763 | | 0.672 | | 74.4 | |

TABLE VII-continued

| | Core Properties | | | | | |
|---|---|---|---|---|---|---|
| | Core Resilience | | | | Core Compression | |
| Example Number | COR 125 | % Change | COR 180 | % Change | PGA (Atti) | % Change |
| Example Set VII-2 | | | | | | |
| Comp. Ex. A | 0.786 | | 0.707 | | 73.5 | |
| Inv. Ex. 3 | 0.795 | 0.1% | 0.715 | 0.3% | 85.1 | −5.2% |
| Inv. Ex. 4 | 0.796 | 0.1% | 0.714 | 0.2% | 84.8 | −5.5% |
| Comp. Ex. D | 0.795 | | 0.713 | | 89.7 | |
| Example Set VII-3 | | | | | | |
| Comp. Ex. B | 0.769 | | 0.687 | | 69.4 | |
| Inv. Ex. 5 | 0.776 | −2.3% | 0.689 | −3.3% | 75.1 | −16.3% |
| Inv. Ex. 6 | 0.791 | −0.4% | 0.709 | −0.6% | 81.2 | −9.5% |
| Inv. Ex. 7 | 0.794 | −0.1% | 0.713 | −0.1% | 76.5 | −14.7% |
| Inv. Ex. 8 | 0.803 | 1.1% | 0.722 | 1.3% | 80.7 | −10.0% |
| Comp. Ex. D | 0.795 | | 0.713 | | 89.7 | |

Percent change in COR and PGA compression (Atti) is the percent the inventive thermoplastic examples shifts from its comparative thermoplastic counterpart using the same thermoplastic materials as shown in Table VII. For example, the percent change in COR resiliency is calculated using the following equation:

% COR Change$_{INV.\ EX.\ 1}$ = (COR125$_{INV.\ EX.\ 1}$ − COR125$_{COMP.\ EX.\ C}$)/COR125$_{COMP.\ EX.\ C}$ A similar calculation is made to establish the percent change in ball compression using the following equation:

% PGA Change = (PGA$_{INV.\ EX.\ 1}$ − PGA$_{COMP.\ EX.\ C}$)/PGA$_{COMP.\ EX.\ C}$ It should be noted that while core resiliency is essentially unchanged, PGA compression is either essentially the same or reduced for the inventive examples. Cores with reduced compression yet having similar resiliency are favored by golf ball design engineers seeking to develop multilayer golf balls with both distance and feel.

TABLE VIII

Two-Piece Balls with Soft Covers

| | | | Nominal Cover Thickness | Nominal Ball Diameter | Ball Resilience | | | | Ball Compression | |
|---|---|---|---|---|---|---|---|---|---|---|
| Example Number | Core Insert | Cover Type | Inch (mm) | Inch (mm) | COR 125 | % Change | COR 180 | % Change | PGA (Atti) | % Change |
| Comparative Set VIII-1 | | | | | | | | | | |
| Comp. Ex. E | Comp. Ex. A | Soft | 0.080 (2.03) | 1.680 (42.67) | 0.781 | | 0.705 | | 82.6 | |
| Inv. Ex. 9 | Inv. Ex. 1 | Soft | 0.065 (1.65) | 1.680 (42.67) | 0.768 | 0.7% | 0.686 | 0.9% | 83.6 | −5.7% |
| Inv. Ex. 10 | Inv. Ex. 2 | Soft | 0.065 (1.65) | 1.680 (42.67) | 0.767 | 0.5% | 0.684 | 0.5% | 84.6 | −4.6% |
| Comp. Ex. G | Comp. Ex. C | Soft | 0.065 (1.65) | 1.680 (42.67) | 0.763 | | 0.680 | | 88.6 | |
| Comparative Set VIII-2 | | | | | | | | | | |
| Comp. Ex. E | Comp. Ex. A | Soft | 0.080 (2.03) | 1.680 (42.67) | 0.781 | | 0.705 | | 82.6 | |
| Inv. Ex. 11 | Inv. Ex. 3 | Soft | 0.065 (1.65) | 1.680 (42.67) | 0.791 | 1.0% | 0.715 | 0.8% | 93.8 | −7.9% |
| Inv. Ex. 12 | Inv. Ex. 4 | Soft | 0.065 (1.65) | 1.680 (42.67) | 0.793 | 1.3% | 0.717 | 1.1% | 92.7 | −9.1% |
| Comp. Ex. H | Comp. Ex. D | Soft | 0.065 (1.65) | 1.680 (42.67) | 0.783 | | 0.709 | | 101.9 | |
| Comparative Set VIII-3 | | | | | | | | | | |
| Comp. Ex. F | Comp. Ex. B | Soft | 0.065 (1.65) | 1.680 (42.67) | 0.766 | | 0.685 | | 79.2 | |
| Inv. Ex. 13 | Inv. Ex. 5 | Soft | 0.065 (1.65) | 1.680 (42.67) | 0.772 | −1.4% | 0.692 | −2.4% | 85.0 | −16.6% |
| Inv. Ex. 14 | Inv. Ex. 6 | Soft | 0.065 (1.65) | 1.680 (42.67) | 0.789 | 0.8% | 0.710 | 0.2% | 91.1 | −10.6% |
| Inv. Ex. 15 | Inv. Ex. 7 | Soft | 0.065 (1.65) | 1.680 (42.67) | 0.790 | 0.9% | 0.712 | 0.4% | 91.7 | −10.0% |
| Inv. Ex. 16 | Inv. Ex. 8 | Soft | 0.065 (1.65) | 1.680 (42.67) | 0.799 | 2.0% | 0.719 | 1.4% | 93.1 | −8.6% |
| Comp. Ex. H | Comp. Ex. D | Soft | 0.065 (1.65) | 1.680 (42.67) | 0.783 | | 0.709 | | 101.9 | |

Percent change in COR and PGA (Atti) compression is the percent the inventive thermoplastic examples shifts from its comparative thermoplastic counterpart using the same thermoplastic core insert as shown in Table VIII for the soft covered two-piece golf balls. For example, the percent change in COR ball resiliency is calculated using the following equation:

% COR Change$_{INV.\ EX.\ 9}$ = (COR125$_{INV.\ EX.\ 9}$ − COR125$_{COMP.\ EX.\ G}$)/COR125$_{COMP.\ EX.\ G}$ A similar calculation is made to establish the percent change in PGA ball compression using the following equation:

% PGA Change$_{INV.\ EX.\ 9}$ = (PGA$_{INV.\ EX.\ 9}$ − PGA$_{COMP.\ EX.\ G}$)/PGA$_{COMP.\ EX.\ G}$ It should be noted that while overall ball resiliency is essentially unchanged, PGA compression is either essentially the same or reduced. Multi-piece golf balls with reduced compression yet having similar resiliency are favored by golfers seeking golf balls with both distance and feel.

TABLE IX

Two-Piece Balls with Hard Covers

| Example Number | Core Insert | Cover Type | Nominal Cover Thickness Inch (mm) | Nominal Ball Diameter Inch (mm) | Ball Resilience | | | | Ball Compression | |
|---|---|---|---|---|---|---|---|---|---|---|
| | | | | | COR 125 | % Change | COR 180 | % Change | PGA (Atti) | % Change |
| Comparative Set IX-1 | | | | | | | | | | |
| Comp. Ex. I | Comp. Ex. A | Hard | 0.080 (2.03) | 1.680 (42.67) | 0.804 | | 0.738 | | 98.8 | |
| Inv. Ex. 17 | Inv. Ex. 1 | Hard | 0.065 (1.65) | 1.680 (42.67) | 0.791 | 0.3% | 0.719 | 0.8% | 98.6 | 0.1% |
| Inv. Ex. 18 | Inv. Ex. 2 | Hard | 0.065 (1.65) | 1.680 (42.67) | 0.788 | −0.1% | 0.715 | 0.3% | 100.2 | 1.7% |
| Comp. Ex. K | Comp. Ex. C | Hard | 0.065 (1.65) | 1.680 (42.67) | 0.789 | | 0.713 | | 98.5 | |
| Comparative Set IX-2 | | | | | | | | | | |
| Comp. Ex. I | Comp. Ex. A | Hard | 0.080 (2.03) | 1.680 (42.67) | 0.804 | | 0.738 | | 98.8 | |
| Inv. Ex. 19 | Inv. Ex. 3 | Hard | 0.065 (1.65) | 1.680 (42.67) | 0.807 | 0.1% | 0.740 | 0.1% | 106.1 | −5.9% |
| Inv. Ex. 20 | Inv. Ex. 4 | Hard | 0.065 (1.65) | 1.680 (42.67) | 0.809 | 0.4% | 0.741 | 0.3% | 108.8 | −3.5% |
| Comp. Ex. L | Comp. Ex. D | Hard | 0.065 (1.65) | 1.680 (42.67)) | 0.806 | | 0.739 | | 112.8 | |
| Comparative Set IX-3 | | | | | | | | | | |
| Comp. Ex. J | Comp. Ex. B | Hard | 0.065 (1.65) | 1.680 (42.67) | 0.791 | | 0.720 | | 95.3 | |
| Inv. Ex. 21 | Inv. Ex. 5 | Hard | 0.065 (1.65) | 1.680 (42.67) | 0.794 | −1.5% | 0.722 | −2.3% | 103.1 | −8.6% |
| Inv. Ex. 22 | Inv. Ex. 6 | Hard | 0.065 (1.65) | 1.680 (42.67) | 0.806 | 0.0% | 0.735 | −0.5% | 104.7 | −7.2% |
| Inv. Ex. 23 | Inv. Ex. | Hard | 0.065 (1.65) | 1.680 (42.67) | 0.809 | 0.4% | 0.739 | 0.0% | 105.3 | −6.6% |
| Inv. Ex. 24 | Inv. Ex. 8 | Hard | 0.065 (1.65) | 1.680 (42.67) | 0.816 | 1.2% | 0.747 | 1.1% | 106.5 | −5.6% |
| Comp. Ex. L | Comp. Ex. D | Hard | 0.065 (1.65) | 1.680 (42.67) | 0.806 | | 0.739 | | 112.8 | |

Percent change in COR and PGA (Atti) compression is the percent the inventive thermoplastic examples shifts from its comparative thermoplastic counterpart using the same thermoplastic core insert as shown in Table IX for the hard-covered two-piece golf balls. For example, the percent change in COR ball resiliency is calculated using the following equation:

$$\% \text{ COR Change} = (COR125_{INV.\ EX.\ 17} - COR125_{COMP.\ EX.\ K})/COR125_{COMP.\ EX.\ K}$$

A similar calculation is made to establish the percent change in PGA ball compression using the following equation:

$$\% \text{ PGA Change} = (PGA_{INV.\ EX.\ 9} - PGA_{COMP.\ EX.\ G})/PGA_{COMP.\ EX.\ G}$$

It should be noted that while overall ball resiliency is essentially unchanged PGA compression is either essentially the same or reduced. Multi-piece golf balls with reduced compression yet having similar resiliency are favored by golfers seeking golf balls with both distance and feel.

General Procedure for Measuring Sound Profiles

The sound profiles for the molded spheres and two-layer golf balls are obtained in a free drop test. A testing chamber (20 inches×20 inches×48 inches high or 50.8 cm×50.8 cm×121.9 cm) is lined with 3-inch (7.62 cm) thick acoustic absorbers. A granite slab (12 inches×12 inches×4 inches thick or 30.5 cm×30.5 cm×10.2 cm) is placed at the base of the chamber for a drop target. Test spheres and balls are dropped from a height of 100 inches (254 cm) onto the granite slab. A microphone placed near the granite slab recorded the sound produced by each golf ball as it struck the slab. The sound waves are converted into electrical impulses and analyzed for frequency and sound pressure impulse for the first acoustic mode. The average for a sampling of 10 balls to 15 balls of each type is calculated, except for the core comparison ball Comp. Ex. A, which used two balls. The results for the cores are described in Table X. The results for the two-piece balls with soft covers are described in Table XI; and the results for the two-piece balls with hard covers in Table XII.

TABLE X

Acoustic Data for Cores

| Example Number | Core Material Type | Sound Modifier Modifier (%) | Sound Modifier Modifier Type | Center Frequency (Hz) | Frequency Shift Hz Shift | Frequency Shift % Hz Shift | Mean SPL dB | SPL Shift dB Shift | SPL Shift % SPL Shift |
|---|---|---|---|---|---|---|---|---|---|
| Comparative Set X-1 | | | | | | | | | |
| Comp. Ex. A | PBR | | | 3,075 | (225) | | 108.9 | (1.4) | |
| Inv. Ex. 1 | Thermoplastic | 30 | C74-35 | 3,275 | (25) | −11% | 109.7 | (0.6) | −43% |
| Inv. Ex. 2 | Thermoplastic | 15 | C74-35 | 3,300 | — | 0% | 109.7 | (0.6) | −43% |
| Comp. Ex. C | Thermoplastic | none | | 3,300 | | | 110.3 | | |
| Comparative Set X-2 | | | | | | | | | |
| Comp. Ex. A | PBR | | | 3,075 | (675) | | 108.9 | (3.8) | |
| Inv. Ex. 3 | Thermoplastic | 30 | C74-35 | 3,550 | (200) | −30% | 110.6 | (2.1) | −55% |
| Inv. Ex. 4 | Thermoplastic | 30 | C74-35 | 3,550 | (200) | −30% | 110.9 | (1.8) | −47% |
| Comp. Ex. D | Thermoplastic | none | n/a | 3,750 | | | 112.7 | | |

TABLE X-continued

Acoustic Data for Cores

| Example Number | Core Material Type | Sound Modifier Modifier (%) | Sound Modifier Modifier Type | Center Frequency (Hz) | Frequency Shift Hz Shift | Frequency Shift % Hz Shift | Mean SPL dB | SPL Shift dB Shift | SPL Shift % SPL Shift |
|---|---|---|---|---|---|---|---|---|---|
| Comparative Set X-3 | | | | | | | | | |
| Comp. Ex. B | PBR | n/a | n/a | 3,125 | (625) | | 108.9 | (3.8) | |
| Inv. Ex. 5 | Thermoplastic | 50 | C69-35 | 3,275 | (475) | −76% | 109.2 | (3.5) | −92% |
| Inv. Ex. 6 | Thermoplastic | 30 | C69-18 | 3,425 | (325) | −52% | 110.2 | (2.5) | −66% |
| Inv. Ex. 7 | Thermoplastic | 30 | C69-35 | 3,450 | (300) | −48% | 110.5 | (2.2) | −58% |
| Inv. Ex. 8 | Thermoplastic | 15 | C69-35 | 3,575 | (175) | −28% | 111.6 | (1.1) | −29% |
| Comp. Ex. D | Thermoplastic | none | n/a | 3,750 | | | 112.7 | | |

The frequency shift for each comparative set of cores is the frequency difference between that core and comparative thermoplastic core for that comparative set. For example, the frequency shift for COMP EX A is calculated using the following equation:

$$\text{Hz SHIFT}_{COMP.\ EX.\ A} = \text{CENTER FREQ}_{COMP.\ EX.\ A} - \text{CENTER FREQ}_{COMP.\ EX.\ C}$$

For example, the frequency shift for Inv. Ex. 2 is calculated using the following equation:

$$\text{Hz SHIFT}_{INV.\ EX.\ 2} = \text{CENTER FREQ}_{INV.\ EX.\ 2} - \text{CENTER FREQ}_{COMP.\ EX.\ C}$$

The percent frequency shift for each of the inventive examples is the percent Hz shift for the inventive example relative to the absolute shift of the PBR core for that comparative set. For example, the relative percent frequency shift for Inv. Ex. 2 is calculated using the following equation:

$$\%\ \text{Hz SHIFT}_{INV.\ EX.\ 2} = \text{Hz SHIFT}_{INV.\ EX.\ 2}/|\text{Hz SHIFT}_{COMP.\ EX.\ A}|$$

A similar set of calculations are made with respect to sound pressure level (SPL). The shift in SPL for Comp. Ex. A is calculated using the following equation:

$$\text{dB SHIFT}_{COMP.\ EX.\ A} = \text{MEAN SPL}_{COMP.\ EX.\ A} - \text{MEAN SPL}_{COMP.\ EX.\ C}$$

The relative percent SPL shift for each of the inventive examples is the percent SPL shift for the inventive example relative to the absolute SPL shift of the PBR core for that comparative set. For example, the relative percent SPL shift for Inv. Ex. 2 is calculated using the following equation:

$$\%\ \text{SPL SHIFT}_{INV.\ EX.\ 2} = \text{dB SHIFT}_{INV.\ EX.\ 2}/|\text{dB SHIFT}_{COMP.\ EX.\ A}|$$

It should be noted that while core resiliency is essentially unchanged a disproportionate decrease in both primary frequency and sound pressure level are preferred.

TABLE XI

Acoustic Data for Two-Piece Balls with Soft Covers

| Example Number | Core Insert | Sound Modifier in Core Modifier (%) | Sound Modifier in Core Modifier Type | Center Frequency (Hz) | Frequency Shift Hz Shift | Frequency Shift % Hz Shift | Mean SPL (dB) | SPL Shift dB Shift | SPL Shift % SPL Shift |
|---|---|---|---|---|---|---|---|---|---|
| Comparative Set XI-1 | | | | | | | | | |
| Comp. Ex. E | Comp. Ex. A | | | 2,950 | (125) | | 110.6 | (0.6) | |
| Inv. Ex. 9 | Inv. Ex. 1 | 30 | C74-35 | 3,000 | (75) | −60% | 110.8 | (0.4) | −67% |
| Inv. Ex. 10 | Inv. Ex. 2 | 15 | C74-35 | 3,025 | (50) | −40% | 110.7 | (0.5) | −83% |
| Comp. Ex. G | Comp. Ex. C | | | 3,075 | | | 111.2 | | |
| Comparative Set XI-2 | | | | | | | | | |
| Comp. Ex. E | Comp. Ex. A | | | 2,950 | (458) | | 110.6 | (2.7) | |
| Inv. Ex. 11 | Inv. Ex. 3 | 30 | C74-35 | 3,225 | (183) | −40% | 111.8 | (1.5) | −56% |
| Inv. Ex. 12 | Inv. Ex. 4 | 30 | C74-35 | 3,225 | (183) | −40% | 112.1 | (1.2) | −44% |
| Comp. Ex. H | Comp. Ex. D | | | 3,408 | | | 113.3 | | |
| Comparative Set XI-3 | | | | | | | | | |
| Comp. Ex. F | Comp. Ex. B | | | 2,950 | (458) | | 110.1 | (3.2) | |
| Inv. Ex. 13 | Inv. Ex. 5 | 50 | C69-35 | 3,025 | (383) | −84% | 111.2 | (2.1) | −66% |
| Inv. Ex. 14 | Inv. Ex. 6 | 30 | C69-18 | 3,150 | (258) | −56% | 111.2 | (2.1) | −66% |
| Inv. Ex. 15 | Inv. Ex. 7 | 30 | C69-35 | 3,175 | (233) | −51% | 111.4 | (1.9) | −59% |
| Inv. Ex. 16 | Inv. Ex. 8 | 15 | C69-35 | 3,250 | (158) | −34% | 112.0 | (1.3) | −41% |
| COMP EX H | COMP EX D | | | 3,408 | | | 113.3 | | |

The frequency shift for each comparative set of two-piece balls with soft covers is the frequency difference between that two-piece ball and comparative two-piece ball with an unmodified thermoplastic core for that comparative set. For example, the frequency shift for Comp. Ex. E is calculated using the following equation:

$$\text{Hz SHIFT}_{COMP.\ EX.\ E} = \text{CENTER FREQ}_{COMP.\ EX.\ E} - \text{CENTER FREQ}_{COMP.\ EX.\ G}$$

For example, the frequency shift for Inv. Ex. 10 is calculated using the following equation:

$$\text{Hz SHIFT}_{INV.\ EX.\ 10} = \text{CENTER FREQ}_{INV.\ EX.\ 10} - \text{CENTER FREQ}_{COMP.\ EX.\ G}$$

The relative percent frequency shift for each of the inventive two-piece golf ball examples is the percent Hz shift for the inventive example relative to the absolute shift of the two-piece ball with the PBR core for that comparative set. For example, the relative percent frequency shift for Inv. Ex. 10 is calculated using the following equation:

$$\%\ \text{Hz SHIFT}_{INV.\ EX.\ 10} = \text{Hz SHIFT}_{INV.\ EX.\ 10} / |\text{Hz SHIFT}_{COMP.\ EX.\ E}|$$

A similar set of calculations are made with respect to sound pressure level (SPL). The shift in SPL for Comp. Ex. E is calculated:

$$\text{dB SHIFT}_{COMP.\ EX.\ E} = \text{MEAN SPL}_{COMP.\ EX.\ E} - \text{MEAN SPL}_{COMP.\ EX.\ G}$$

The relative percent SPL shift for each of the inventive two-piece golf ball examples is the percent SPL shift for the inventive example relative to the absolute SPL shift of the two-piece golf ball with the PBR core for that comparative set. For example, the relative percent SPL shift for Inv. Ex. 10 is calculated using the following equation:

$$\%\ \text{SPL SHIFT}_{INV.\ EX.\ 10} = \text{dB SHIFT}_{INV.\ EX.\ 10} / |\text{dB SHIFT}_{COMP.\ EX.\ E}|$$

It should be noted that while overall golf ball resiliency is essentially unchanged a relative decrease in both primary frequency and sound pressure level are preferred.

The frequency shift for each comparative set of two-piece balls with hard covers is the frequency difference between that two-piece ball and the comparative two-piece ball with an unmodified thermoplastic core for that comparative set. For example, the frequency shift for Comp. Ex. I is calculated using the following equation:

$$\text{Hz SHIFT}_{COMP.\ EX.\ I} = \text{CENTER FREQ}_{COMP.\ EX.\ I} - \text{CENTER FREQ}_{COMP.\ EX.\ K}$$

For example, the frequency shift for Inv. Ex. 18 is calculated using the following equation:

$$\text{Hz SHIFT}_{INV.\ EX.\ 18} = \text{CENTER FREQ}_{INV.\ EX.\ 18} - \text{CENTER FREQ}_{COMP.\ EX.\ K}$$

The relative percent frequency shift for each of the inventive two-piece golf ball examples is the percent Hz shift for the inventive example relative to the absolute shift of the two-piece ball with the PBR core for that comparative set. For example, the relative percent frequency shift for Inv. Ex. 18 is calculated using the following equation:

$$\%\ \text{Hz SHIFT}_{INV.\ EX.\ 18} = \text{Hz SHIFT}_{INV.\ EX.\ 18} / |\text{Hz SHIFT}_{COMP.\ EX.\ I}|$$

A similar set of calculations are made with respect to sound pressure level (SPL). The shift in SPL for Comp. Ex. I is calculated using the following equation:

$$\text{dB SHIFT}_{COMP.\ EX.\ I} = \text{MEAN SPL}_{COMP.\ EX.\ I} - \text{MEAN SPL}_{COMP.\ EX.\ K}$$

The relative percent SPL shift for each of the inventive two-piece golf ball examples is the percent SPL shift for the inventive example relative to the absolute SPL shift of the two-piece golf ball with the PBR core for that comparative set. For example, the relative percent SPL shift for Inv. Ex. 18 is calculated using the following equation:

$$\%\ \text{SPL SHIFT}_{INV.\ EX.\ 18} = \text{SPL SHIFT}_{INV.\ EX.\ 18} / |\text{SPL SHIFT}_{COMP.\ EX.\ I}|$$

It should be noted that while overall golf ball resiliency is essentially unchanged a relative decrease in both primary frequency and sound pressure level are preferred.

TABLE XII

Acoustic Data for Two-Piece Balls with Hard Covers

| Example Number | Core Insert | Sound Modifier in Core | | Center Frequency (Hz) | Frequency Shift | | Mean SPL (dB) | SPL Shift | |
|---|---|---|---|---|---|---|---|---|---|
| | | % Modifier | Modifier Type | | Hz Shift | % Hz Shift | | dB Shift | % SPL Shift |
| Comparative Set XII-1 | | | | | | | | | |
| Comp. Ex. I | Comp. Ex. A | | | 3,350 | (58) | | 112.5 | 1.0 | |
| Inv. Ex. 17 | Inv. Ex. 1 | 30% | C74-35 | 3,270 | (138) | −238% | 111.1 | (0.4) | −40% |
| Inv. Ex. 18 | Inv. Ex. 2 | 15% | C74-35 | 3,325 | (83) | −143% | 111.2 | (0.3) | −30% |
| Comp. Ex. K | Comp. Ex. C | | | 3,408 | | | 111.5 | | |
| Comparative Set XII-2 | | | | | | | | | |
| Comp. Ex. I | Comp. Ex. A | | | 3,350 | (300) | | 112.5 | (0.7) | |
| Inv. Ex. 19 | Inv. Ex. 3 | 30% | C74-35 | 3,500 | (150) | −50% | 112.0 | (1.2) | −171% |
| Inv. Ex. 20 | Inv. Ex. 4 | 30% | C74-35 | 3,500 | (150) | −50% | 112.4 | (0.8) | −114% |
| Comp. Ex. L | Comp. Ex. D | | | 3,650 | | | 113.2 | | |
| Comparative Set XII-3 | | | | | | | | | |
| Comp. Ex. J | Comp. Ex. B | | | 3,250 | (400) | | 111.3 | (1.9) | |
| Inv. Ex. 21 | Inv. Ex. 5 | 50% | C69-35 | 3,300 | (350) | −88% | 111.2 | (2.0) | −105% |
| Inv. Ex. 22 | Inv. Ex. 6 | 30% | C69-18 | 3,425 | (225) | −56% | 111.6 | (1.6) | −84% |
| Inv. Ex. 23 | Inv. Ex. 7 | 30% | C69-35 | 3,500 | (150) | −38% | 111.9 | (1.3) | −68% |
| Inv. Ex. 24 | Inv. Ex. 8 | 15% | C69-35 | 3,500 | (150) | −38% | 112.3 | (0.9) | −47% |
| Comp. Ex. L | Comp. Ex. D | | | 3,650 | | | 113.2 | | |

While certain preferred embodiments of the present invention have been described and specifically exemplified above, it is not intended that the present invention be limited to such embodiments. Various modifications may be made without departing from the scope and spirit of the present invention, as set forth in the following claims.

OTHER EMBODIMENTS

13. The golf ball of claim 11, wherein the ball resiliency is from 0.650 to 0.830 at 38.1 meters per second and the ball compression is from 0 Atti to 120 Atti.

14. The golf ball of claim 11, wherein the frequency shift of the ball is at least minus 30 percent and the sound pressure level shift of the ball is at least minus 25 percent.

15. The golf ball of claim 11, further including (c) at least one intermediate layer positioned between the at least one core and the cover.

16. The golf ball of claim 15, wherein the at least one core or the at least one intermediate layer is made from the formulation; or wherein the at least one core and the at least one intermediate layer is made from the formulation.

17. The golf ball of claim 15, wherein the at least one ethylene acid copolymer of the formulation further includes (C) from 10 weight percent to 30 weight percent of at least one α,β-ethylenically unsaturated carboxylic acid ester having from 3 carbon atoms to 8 carbon atoms.

18. The golf ball of claim 11, wherein the formulation further includes: (2) at least one aliphatic, monofunctional organic acid having 4 carbon atoms to 36 carbon atoms, or salt thereof; wherein the longest carbon chain of the at least one aliphatic, monofunctional organic acid or salt thereof, component (2), is substituted with from one to three substituents independently selected from the group consisting of alkyl groups having from 1 carbon atom to 8 carbon atoms; and wherein the concentration of the at least one aliphatic, monofunctional organic acid or salt thereof, component (2), is from 20 weight percent to 40 weight percent, based on the total weight of the thermoplastic composition.

19. The golf ball of claim 18, wherein the combined acid moieties of component (1) and component (2) are neutralized to a level of from 25 percent to 220 percent.

20. The golf ball of claim 18, wherein the at least one aliphatic, monofunctional organic acid, component (2), is a linear, unsaturated aliphatic, monofunctional organic acid having from 16 carbon atoms to 24 carbon atoms.

21. The golf ball of claim 11, wherein the formulation further includes (iii) from 10 weight percent to 30 weight percent of at least one α,β-ethylenically unsaturated carboxylic acid ester having from 3 carbon atoms to 8 carbon atoms; and wherein the at least one α,β-ethylenically unsaturated carboxylic acid ester having from 3 carbon atoms to 8 carbon atoms is acrylic acid, methacrylic acid, or a combination of acrylic acid and methacrylic acid.

22. The golf ball of claim 11, wherein the crosslinked material, component (ii), exhibits at least one of the following properties:
(I) a coefficient of restitution at 125 feet/second (38.1 m/s) of at least 0.600;
(II) an Atti Compression of less than 110; or
(III) an Automated Design Corporation deflection of at least 100 mils.

21. The golf ball of claim 11, wherein the crosslinked material, component (ii), is a crosslinked rubber selected from the group consisting of crosslinked polybutadiene, crosslinked styrene-butadiene, or crosslinked ethylene-propylene-diene methylene.

23. The golf ball of claim 11, wherein the crosslinked material, component (ii), is a crosslinked elastomer selected from the group consisting of crosslinked ethylene/α-olefin block interpolymer.

24. The golf ball of claim 11, wherein the thermoplastic composition further comprises one or more fillers; wherein the one or more fillers is selected from the group consisting of barium sulfate, calcium carbonate, titanium dioxide, zinc oxide, or mixtures thereof.

25. The golf ball of claim 11, wherein the cover is prepared from a polyurethane composition or an ionomer composition.

What is claimed is:

1. A formulation for making at least one element of a golf ball comprising:
    (i) from 50 weight percent to 95 weight percent of a thermoplastic composition comprising:
        (1) at least one ethylene acid copolymer consisting essentially of copolymerized comonomers of:
            (A) ethylene, and
            (B) from 5 weight percent to 25 weight percent of at least one α,β-ethylenically unsaturated carboxylic acid having from 3 carbon atoms to 8 carbon atoms, based on the total weight of monomers present in the ethylene acid copolymer; and
        (2) at least one aliphatic, monofunctional organic acid having 4 carbon atoms to 36 carbon atoms, or salt thereof; wherein the longest carbon chain of the at least one aliphatic, monofunctional organic acid or salt thereof, component (2), is substituted with from one to three substituents independently selected from the group consisting of alkyl groups having from 1 carbon atom to 8 carbon atoms; and wherein the concentration of the at least one aliphatic, monofunctional organic acid or salt thereof, component (2), is from 20 weight percent to 40 weight percent, based on the total weight of the thermoplastic composition; and
    wherein the combined acid moieties of components (1) and (2) are neutralized to a level of from 25 percent to 220 percent; and
    (ii) from 5 weight percent to 50 weight percent of a crosslinked material having a gel content of at least 80 weight percent, wherein the crosslinked material is a crosslinked elastomer, a crosslinked rubber, or a blend of a crosslinked elastomer and a crosslinked rubber.

2. The formulation of claim 1, wherein the at least one aliphatic, monofunctional organic acid or salt thereof, component (2), is a linear, unsaturated aliphatic, monofunctional organic acid having from 16 carbon atoms to 24 carbon atoms.

3. The formulation of claim 1, wherein the formulation further includes (iii) from 10 weight percent to 30 weight percent of at least one α,β-ethylenically unsaturated carboxylic acid ester having from 3 carbon atoms to 8 carbon atoms; and wherein the at least one α,β-ethylenically unsaturated carboxylic acid ester having from 3 carbon atoms to 8 carbon atoms is acrylic acid, methacrylic acid, or a combination of acrylic acid and methacrylic acid.

4. A core of a golf ball comprising the formulation of claim 1.

5. The core of claim 4, wherein the core resiliency is from 0.700 to 0.875 at 125 feet per second and the core compression is from 0 PGA (Atti) to 120 PGA (Atti); and wherein the frequency shift of the core is at least minus 10 percent and the sound pressure level shift is at least minus 25 percent.

6. An intermediate layer comprising the formulation of claim 1, wherein the intermediate layer is disposed between a core of a golf ball and a cover of a golf ball.

7. A process for making at least one element of a golf ball comprising mixing:
(i) from 50 weight percent to 95 weight percent of a thermoplastic composition comprising:
(1) at least one ethylene acid copolymer consisting essentially of copolymerized comonomers of:
(A) ethylene, and
(B) from 5 weight percent to 25 weight percent of at least one $\alpha,\beta$-ethylenically unsaturated carboxylic acid having from 3 carbon atoms to 8 carbon atoms, based on the total weight of monomers present in the ethylene acid copolymer; and
(2) at least one aliphatic, monofunctional organic acid having 4 carbon atoms to 36 carbon atoms, or salt thereof; wherein the longest carbon chain of the at least one aliphatic, monofunctional organic acid or salt thereof, component (2), is substituted with from one to three substituents independently selected from the group consisting of alkyl groups having from 1 carbon atom to 8 carbon atoms; and wherein the concentration of the at least one aliphatic, monofunctional organic acid or salt thereof, component (2), is from 20 weight percent to 40 weight percent, based on the total weight of the thermoplastic composition; and
wherein the combined acid moieties of components (1) and (2) are neutralized to a level of from 25 percent to 220 percent; and
(ii) from 5 weight percent to 50 weight percent of a crosslinked material having a gel content of at least 80 weight percent, wherein the crosslinked material is a crosslinked elastomer, a crosslinked rubber, or a blend of a crosslinked elastomer and a crosslinked rubber.

8. A multilayer golf ball comprising:
(a) at least one core; and
(b) a cover;
wherein the at least one core, component (a), is made from a formulation comprising:
(i) from 50 weight percent to 95 weight percent of a thermoplastic composition comprising:
(1) at least one ethylene acid copolymer consisting essentially of copolymerized comonomers of:
(A) ethylene, and
(B) from 5 weight percent to 25 weight percent of at least one $\alpha,\beta$-ethylenically unsaturated carboxylic acid having from 3 carbon atoms to 8 carbon atoms, based on the total weight of monomers present in the ethylene acid copolymer; and
(2) at least one aliphatic, monofunctional organic acid having 4 carbon atoms to 36 carbon atoms, or salt thereof; wherein the longest carbon chain of the at least one aliphatic, monofunctional organic acid or salt thereof, component (2), is substituted with from one to three substituents independently selected from the group consisting of alkyl groups having from 1 carbon atom to 8 carbon atoms; and wherein the concentration of the at least one aliphatic, monofunctional organic acid or salt thereof, component (2), is from 20 weight percent to 40 weight percent, based on the total weight of the thermoplastic composition; and
wherein the combined acid moieties of components (1) and (2) are neutralized to a level of from 25 percent to 220 percent; and
(ii) from 5 weight percent to 50 weight percent of a crosslinked material having a gel content of at least 80 weight percent, wherein the crosslinked material is a crosslinked elastomer, a crosslinked rubber, or a blend of a crosslinked elastomer and a crosslinked rubber.

* * * * *